US010210091B2

(12) United States Patent
Hughes

(10) Patent No.: US 10,210,091 B2
(45) Date of Patent: *Feb. 19, 2019

(54) NO-LOCALITY HINT VECTOR MEMORY ACCESS PROCESSORS, METHODS, SYSTEMS, AND INSTRUCTIONS

(71) Applicant: Intel Corporation, Santa Clara, CA (US)

(72) Inventor: Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,500

(22) Filed: Feb. 15, 2017

(65) Prior Publication Data
US 2017/0300420 A1 Oct. 19, 2017

Related U.S. Application Data

(63) Continuation of application No. 14/335,006, filed on Jul. 18, 2014, now Pat. No. 9,600,442.

(51) Int. Cl.
G06F 12/0877 (2016.01)
G06F 12/0897 (2016.01)
(Continued)

(52) U.S. Cl.
CPC ............ *G06F 12/0877* (2013.01); *G06F 9/30* (2013.01); *G06F 9/30036* (2013.01);
(Continued)

(58) Field of Classification Search
CPC ............ G06F 12/0811; G06F 12/0806; G06F 12/0846; G06F 12/0897; G06F 12/0815;
(Continued)

(56) References Cited

U.S. PATENT DOCUMENTS 5,708,849 A 1/1998 Coke et al.
5,966,528 A 10/1999 Wilkinson et al.
(Continued)

FOREIGN PATENT DOCUMENTS

CN 103930883 A 7/2014
TW 201218771 A 5/2012

OTHER PUBLICATIONS

Notice of Allowance received for Taiwanese Patent Application No. 104118928, dated Oct. 20, 2016, 2 pages of Taiwanese Notice of Allowance only.

(Continued)

*Primary Examiner* — Zhuo H Li
(74) *Attorney, Agent, or Firm* — Nicholson De Vos Webster & Elliott LLP

(57) ABSTRACT

A processor of an aspect includes a plurality of packed data registers, and a decode unit to decode a no-locality hint vector memory access instruction. The no-locality hint vector memory access instruction to indicate a packed data register of the plurality of packed data registers that is to have a source packed memory indices. The source packed memory indices to have a plurality of memory indices. The no-locality hint vector memory access instruction is to provide a no-locality hint to the processor for data elements that are to be accessed with the memory indices. The processor also includes an execution unit coupled with the decode unit and the plurality of packed data registers. The execution unit, in response to the no-locality hint vector memory access instruction, is to access the data elements at memory locations that are based on the memory indices.

17 Claims, 22 Drawing Sheets

(51) Int. Cl.
  *G06F 12/0862* (2016.01)
  *G06F 9/30* (2018.01)
  *G06F 15/80* (2006.01)
  *G06F 12/0811* (2016.01)

(52) U.S. Cl.
  CPC ...... *G06F 12/0811* (2013.01); *G06F 12/0862* (2013.01); *G06F 12/0897* (2013.01); *G06F 15/8069* (2013.01); *G06F 2212/1016* (2013.01); *G06F 2212/1024* (2013.01); *G06F 2212/27* (2013.01); *G06F 2212/283* (2013.01); *G06F 2212/6028* (2013.01)

(58) Field of Classification Search
  CPC ............. G06F 12/1045; G06F 9/30043; G06F 9/3005; G06F 12/0877; G06F 2212/27; G06F 2212/1024
  See application file for complete search history.

(56) References Cited

U.S. PATENT DOCUMENTS

| | | | |
|---|---|---|---|
| 7,627,735 | B2 | 12/2009 | Espasa et al. |
| 7,647,557 | B2 | 1/2010 | Janus |
| 8,074,026 | B2 | 12/2011 | Kim et al. |
| 8,447,962 | B2 | 5/2013 | Hughes et al. |
| 8,478,941 | B2 | 7/2013 | Hughes et al. |
| 8,578,097 | B2 | 11/2013 | Kim et al. |
| 8,667,221 | B2 | 3/2014 | Kim et al. |
| 8,688,957 | B2 | 4/2014 | Smelyanskiy et al. |
| 8,799,577 | B2 | 8/2014 | Hughes et al. |
| 8,892,848 | B2 | 11/2014 | Sprangle et al. |
| 9,600,442 | B2 * | 3/2017 | Hughes ............... G06F 12/0877 |
| 2010/0106940 | A1 | 4/2010 | Muff et al. |
| 2010/0169579 | A1 * | 7/2010 | Sheaffer .............. G06F 12/0831 711/141 |
| 2011/0153983 | A1 | 6/2011 | Hughes et al. |
| 2012/0137074 | A1 | 5/2012 | Kim et al. |
| 2013/0159679 | A1 * | 6/2013 | McCormick, Jr. .......................... G06F 9/30043 712/220 |
| 2013/0318306 | A1 | 11/2013 | Gonion |
| 2014/0019712 | A1 | 1/2014 | Ould-Ahmed-Vall et al. |
| 2014/0095779 | A1 * | 4/2014 | Forsyth ................... G06F 12/00 711/105 |
| 2014/0201498 | A1 | 7/2014 | Ould-Ahmed-Vall et al. |
| 2014/0281425 | A1 | 9/2014 | Valentine et al. |
| 2017/0300420 | A1 | 10/2017 | Hughes |

OTHER PUBLICATIONS

Notice of Allowance received for U.S. Appl. No. 14/335,006, dated Nov. 3, 2016, 7 pages.
Office Action and Search Report received for Taiwanese Patent Application No. 104118928, dated Apr. 25, 2016, 7 pages of Taiwanese Office Action including 4 pages of English Translation.
Non-Final Office Action received for U.S. Appl. No. 14/335,006, dated May 13, 2016, 9 pages.
Intel, "Intel® 64 and IA-32 Architectures Software Developer's Manual," Combined vols. 1, 2A, 2B, 2C, 3A, 3B and 3C, Feb. 2014, 22 pages.
Intel, "Intel® Advanced Vector Extensions Programming Reference," Jun. 2011, 28 pages.
Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Office Action received for Chinese Patent Application No. 201510341039.4, dated May 27, 2017, 35 pages of Chinese Office Action including 21 pages of English Translation.
Notice of Allowance received for Chinese Patent Application No. 201510341039.4, dated Dec. 19, 2017, 4 pages of Chinese Notice of Allowance including 2 pages of English Translation.
Office Action received for Chinese Patent Application No. 201510341039A, dated May 27, 2017, 14 pages of Chinese Office Action only.
Intel, "Intel Advanced Vector Extensions Programming Reference", document reference No. 319433-011, Jun. 2011, 595 pages.
Non-Final Office Action from U.S. Appl. No. 15/941,995, dated Jun. 21, 2018, 13 pages.
Non-Final Office Action from U.S. Appl. No. 15/942,046, dated Jun. 21, 2018, 13 pages.

* cited by examiner

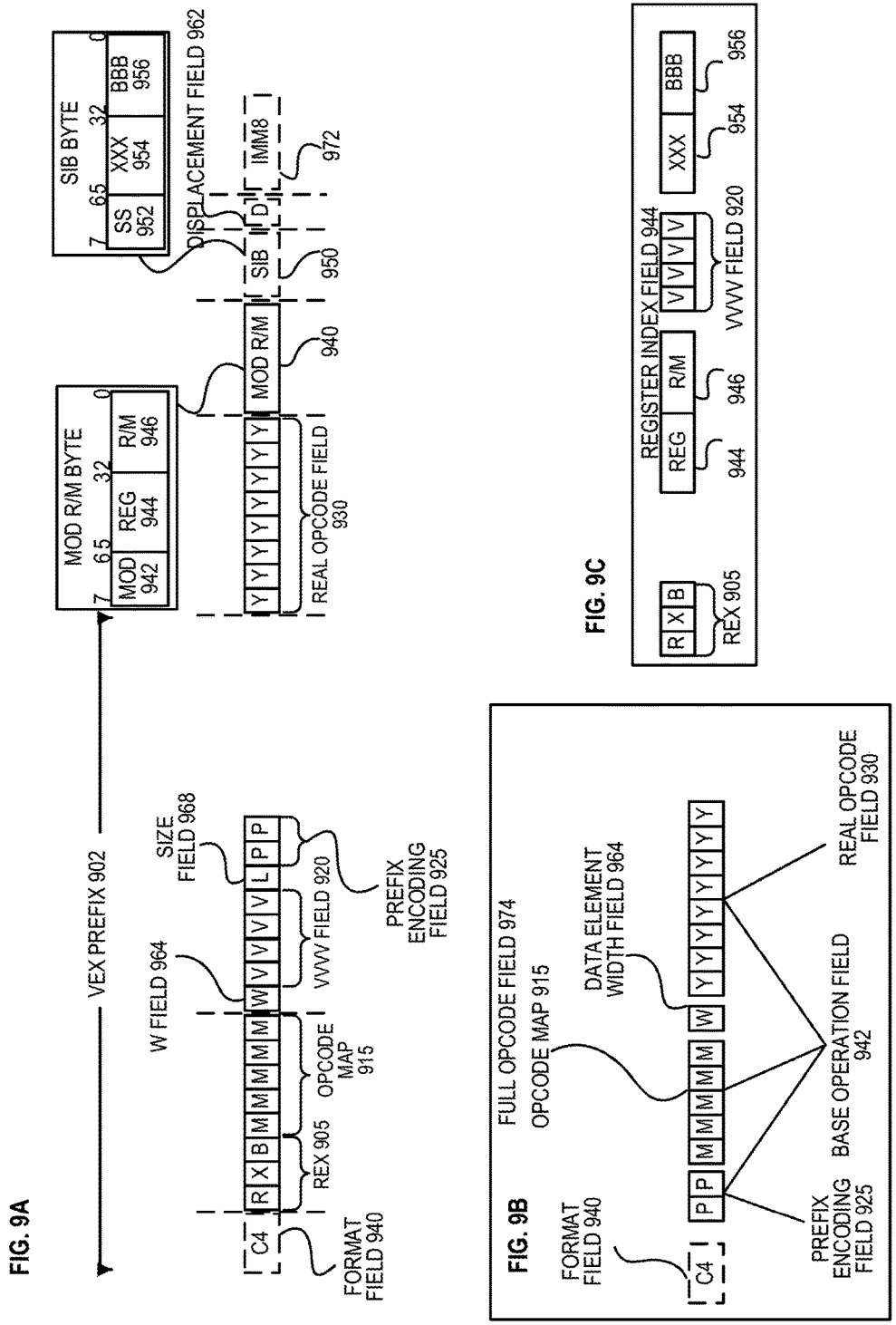

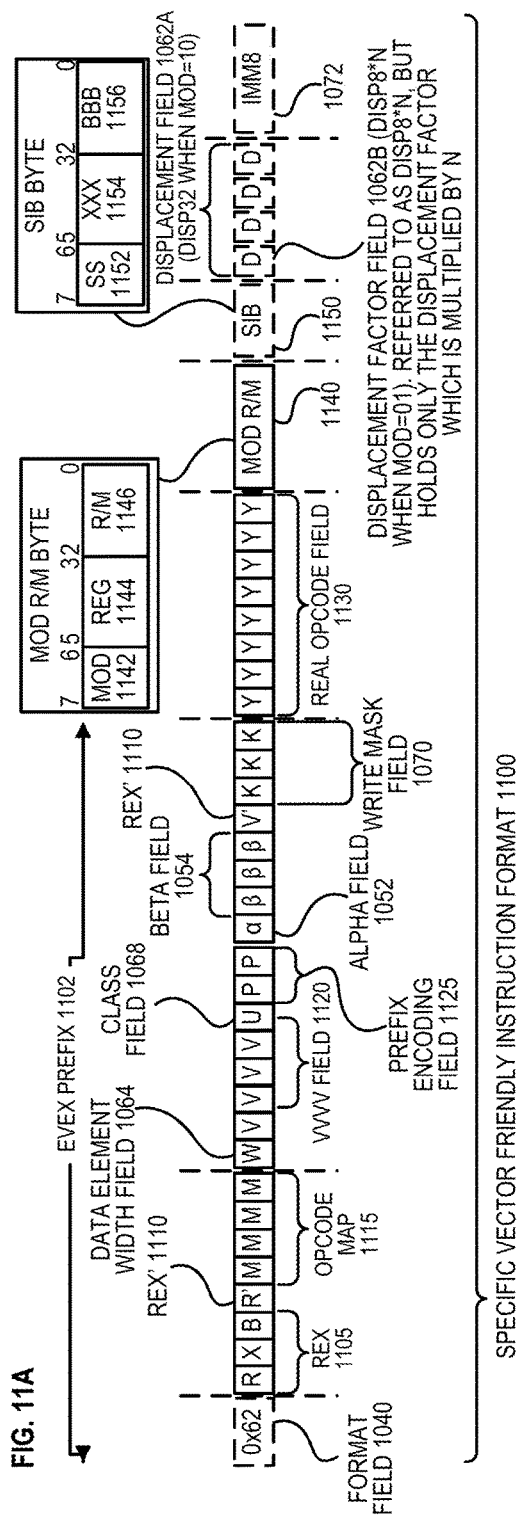
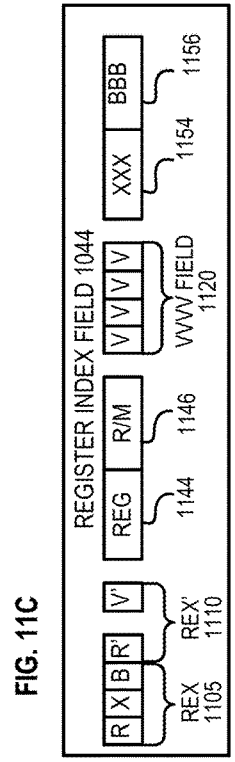
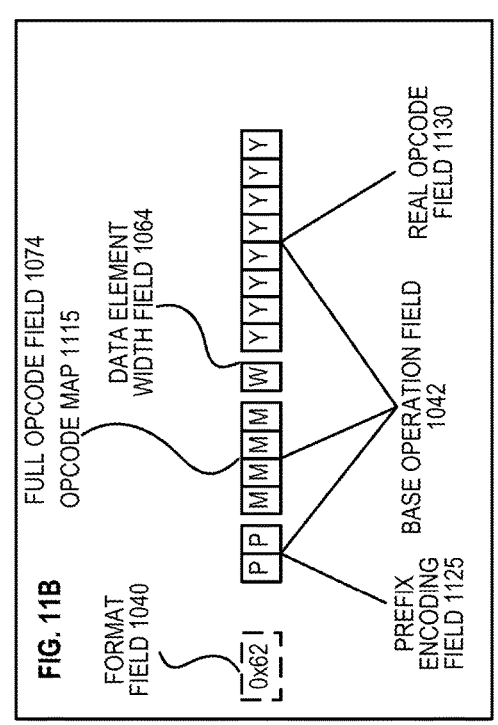
FIG. 11A
FIG. 11B
FIG. 11C

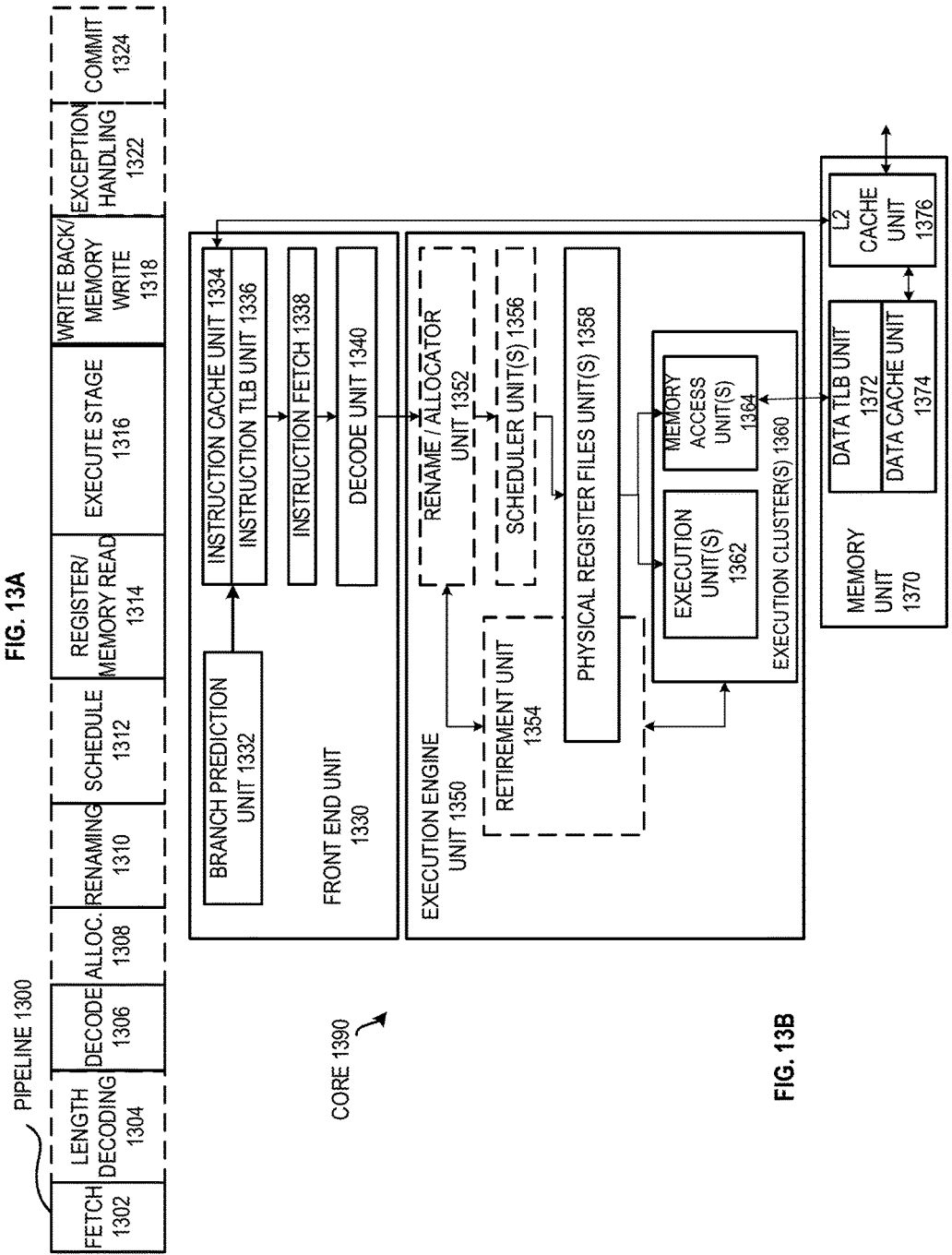

NO-LOCALITY HINT VECTOR MEMORY ACCESS PROCESSORS, METHODS, SYSTEMS, AND INSTRUCTIONS

RELATED APPLICATIONS

The present application is a continuation of U.S. patent application Ser. No. 14/335,006, filed on Jul. 18, 2014, entitled "NO-LOCALITY HINT VECTOR MEMORY ACCESS PROCESSORS, METHODS, SYSTEMS, AND INSTRUCTIONS", which is hereby incorporated herein by reference in its entirety and for all purposes.

BACKGROUND

Technical Field

Embodiments relate to processors. In particular, embodiments relate to processors to perform vector memory access instructions such as gather and/or scatter instructions.

Background Information

Processors are commonly operable to perform instructions to access memory. For example, processors may execute load instructions to load or read data from memory and/or store instructions to store or write data to memory.

Certain processors are operable to execute vector gather instructions. These vector gather instructions are also referred to simply as gather instructions. Intel® Advanced Vector Extensions Programming Reference, document reference number 319433-011, published June 2011, describes several gather instructions. Examples include VGATHERDPD, VGATHERQPD, VGATHERDPS, VGATHERQPS, VPGATHERDD, VPGATHERQD, VPGATHERDQ, and VPGATHERQQ. These gather instructions may cause the processor to gather, read, or load multiple potentially non-contiguous data elements from locations in memory indicated by multiple corresponding memory indices. The gathered data elements may be stored in a destination vector register of the processor.

BRIEF DESCRIPTION OF THE DRAWINGS

The invention may best be understood by referring to the following description and accompanying drawings that are used to illustrate embodiments. In the drawings:

FIGS. 9A-9C are block diagrams illustrating a generic vector friendly instruction format and instruction templates thereof, according to embodiments of the invention.

FIG. 11A-D is a block diagram illustrating an exemplary specific vector friendly instruction format and fields thereof, according to embodiments of the invention.

FIG. 13A is a block diagram illustrating an embodiment of an in-order pipeline and an embodiment of a register renaming out-of-order issue/execution pipeline.

FIG. 13B is a block diagram of an embodiment of processor core including a front end unit coupled to an execution engine unit and both coupled to a memory unit.

DETAILED DESCRIPTION OF EMBODIMENTS

Disclosed herein are no-locality hint vector memory access instructions (e.g., no-locality hint gather instructions, no-locality hint scatter instructions), processors to perform the instructions, methods performed by the processors when performing the instructions, and systems incorporating one or more processors to perform the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
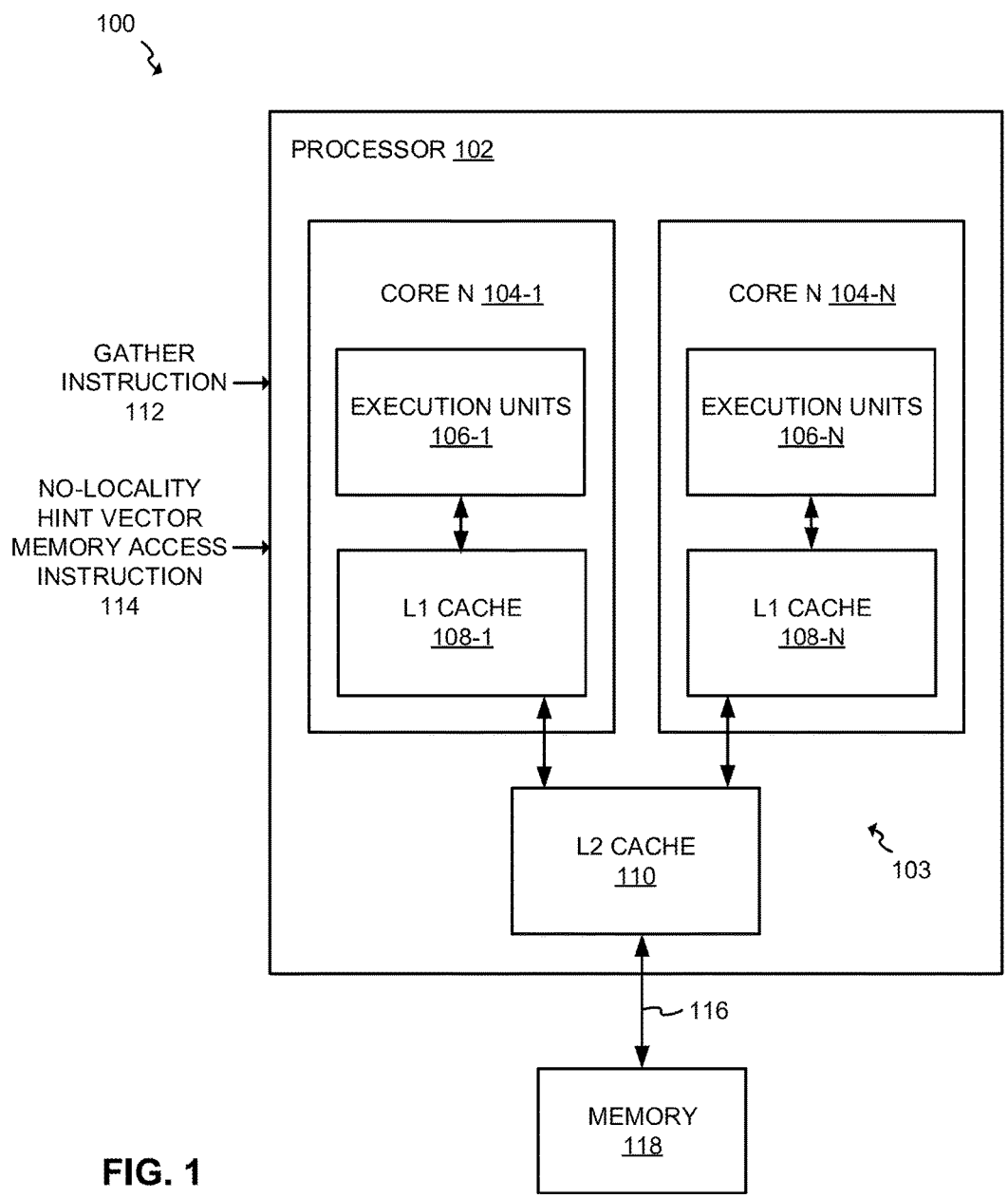
FIG. 1 is a block diagram of an embodiment of a system suitable for implementing embodiments that includes a processor having a cache hierarchy and a memory.

FIG. 1 is a block diagram of an embodiment of a system 100 that includes a processor 102 having a cache hierarchy 103 and a memory 118. The processor and the memory are coupled together by a coupling mechanism 116, such as, for example, one or more interconnects, a chipset, or the like.

The processor includes one or more cores 104. In the illustrated example, the processor includes a first core (core 1) 104-1 optionally up to an Nth core (core N) 104-N. The processor may include any desired number of cores (e.g., often ranging from one to on the order of hundreds). Core 1 includes one or more execution units 106-1 and core N includes one or more execution units 106-N.

Typically the processor may also have one or more caches 108, 110. The caches may represent relatively smaller and faster types of storage than the memory 118. The caches may also be closer to the cores and/or execution units than the memory. The caches may be used to cache or store data brought into the processor from the memory (e.g., by the gather instruction 112) to provide faster subsequent accesses to the data. When the processor wants to read data from the memory, or write data to the memory, it may first check to see if a copy of the data is stored in the caches. If the data is found in a cache, the processor may access the data from the cache more quickly than if the data were accessed from the memory. As a result, including the caches may help to reduce the average amount of time needed to access data to be processed by the processor. This in turn may help to improve the performance and/or throughput of the processor.

Referring again to FIG. 1, the illustrated processor has a cache hierarchy 103 including multiple levels of cache. The cache levels differ in their relative closeness to the cores and/or to the execution units of the processor. Core 1 has a first level cache or level 1 (L1) cache 108-1. Similarly, core N has an L1 cache 108-N. Each of the L1 caches may be dedicated to the corresponding core in which it is included. The L1 caches represent the cache level closest to the cores. The processor also has a second level cache or level 2 (L2) cache 110. The L2 cache represents the next closest cache level to the cores. In some implementations, the L2 cache may be shared by the cores. Although not shown, there may optionally be one or more additional cache levels still farther from the cores (e.g., a level 3 (L3) cache). Caches closer to the cores (e.g., the L1 caches) generally tend to be smaller than caches farther from the cores (e.g., the L2 cache). Commonly, one or more cache levels relatively closer to the cores are monolithically integrated on-die with the cores, whereas one or more cache levels farther from the cores may either be monolithically integrated on-die with the cores, or may be off-die (e.g., in a separate chip mounted on the motherboard). Accesses from the cores to the L1 caches tend to be faster than accesses to the L2 cache, accesses from the cores to the L2 cache tends to be faster than accesses to the L3 cache, and accesses from the cores to the L3 cache tends to be faster than accesses from the cores to the external memory.

One reason for including caches in processors is that memory references often have a "locality" attribute. For example, references to data in memory often have temporal and/or spatial locality. Temporal locality implies that, when data is accessed from an address in memory, the same data is likely to be accessed again within a short period of time. By way of example, this may be the case when a same value needs to be reused in a loop, is used repetitively in a set of calculations, or for various other reasons. In such cases, it may be beneficial, after accessing the data from the memory, to store the data in a cache so that subsequent accesses to the data may be performed more quickly from the cache instead of slowly from the memory.

Spatial locality implies that, when a given data is accessed from an address in memory, nearby data at nearby addresses is also likely to be accessed within a short period of time. By way of example, both sets of data may be part of the same content (e.g., an image, a table, a datastructure, a video, etc.), and may be processed around the same time. Spatial locality may also occur for various other reasons. Caches take advantage of spatial locality by storing not only the data initially needed, but also nearby data from nearby addresses. Typically, the minimum amount of data accessed from the memory and stored in the cache is a whole cache line amount of data even when only a much smaller amount of data may initially be needed. For example, typically an entire 512-bit cache line may be accessed from memory and stored in the cache even if only a single 8-bit, 16-bit, 32-bit, 64-bit, or 128-bit data element is initially needed. If spatial locality exists this will be beneficial since it is likely that the additional data brought into the cache will also be needed in the near future.

In order for caches to be effective, it is important to keep them filled with relevant data that is likely to be needed in the near future. During operation, data in the caches will be continually changed by evicting data that is not likely to be needed in the near future to make room for data that is likely to be needed in the near future. Various replacement algorithms and policies are known in the arts for this purpose. Such replacement algorithms and policies are often heavily based on the age of the data (e.g., a least recently used indication) due to temporal locality.

The gather instruction 112 takes advantage of temporal and/or spatial locality by storing data elements that have been gathered from the memory 118 in the cache hierarchy 103. Many applications and types of data show significant spatial and/or temporal locality in their access stream and thereby benefit from accessing and storing a whole cache line amount of data in the cache for each data element gathered. However, not all applications and/or types of data have sufficient temporal and/or spatial locality to justify accessing and storing whole cache lines in the caches for gather and/or scatter instructions. Some applications and/or types of data exhibit little spatial and/or temporal locality for the data elements to be gathered and/or scattered. Certain data elements may be needed once, but may be unlikely to be needed again in the near future. For example, this may be the case in certain streaming data applications, high performance computing applications, applications having a stream of very sparse memory accesses, and in various other applications. Moreover, in many cases a programmer and/or the software (e.g., an operating system) may be able to know this. One possible approach is to allow such data to be stored in the cache just like other data brought into the processor from memory. However, a drawback with this approach is that storing such data in the caches may evict frequently used data that is likely to be reused by the processor. Also, this data may stay in the caches for a period of time until eventually becoming evicted from the caches, often without ever having been reused. Such data effectively pollutes the caches and takes up valuable storage space that could instead have been used to store frequently used data in order to increase performance.

In addition, the gather instruction 112 is a packed or vector-type instruction that gathers a vector's worth of data elements. Each gathered data element may potentially bring in a whole cache line's worth of data to be stored in the cache which may compound the amount of cache pollution if sufficient spatial and/or temporal locality is not present. This can become especially significant for certain gather instructions that gather four, eight, sixteen, or thirty-two data elements, for example. In addition, accessing whole cache line amounts of data for each gathered data element may waste valuable bus or interconnect bandwidth (e.g., on the interconnects to the caches and/or on the interconnect to the memory) when there is insufficient spatial locality. For example, 512-bits may be retrieved from memory when only a single 8-bit, 16-bit, 32-bit, or 64-bit data element is needed and there is low spatial locality. Accessing only the needed data element, or at least less than a whole cache line amount of data, may better utilize the interconnect bandwidth.

Referring again to FIG. 1, the processor and/or one or more of the cores may receive and perform a no-locality hint memory access instruction 114 (e.g., a no-locality hint vector load or gather instruction and/or a no-locality hint vector store or scatter instruction). The hint may indicate that the data to be accessed (e.g., gathered or scattered) has insufficient spatial and/or temporal locality. In some embodiments, the no-locality hint may be a no-temporal locality hint. In other embodiments, the no-locality hint may be a no-spatial locality hint. In still other embodiments, the no-locality hint may be a no-temporal and no-spatial locality hint. In the case of a no-temporal locality hint, in some embodiments, gathered data elements may bypass the cache hierarchy 103 and/or not be stored in the cache hierarchy 103, which may help to reduce cache pollution. In the case of a no-spatial locality hint, in some embodiments, accesses to data elements may be performed with only sub-cache line amounts of data (e.g., half or quarter cache line amounts of data), or in some cases single data element amounts of data, which may help to reduce waste of interconnect bandwidth and/or reduce power consumption. Advantageously, the no-locality hint memory access instruction 114 may help to improve performance and/or reduce power consumption at times when there is insufficient spatial and/or temporal locality.

Figure 2:
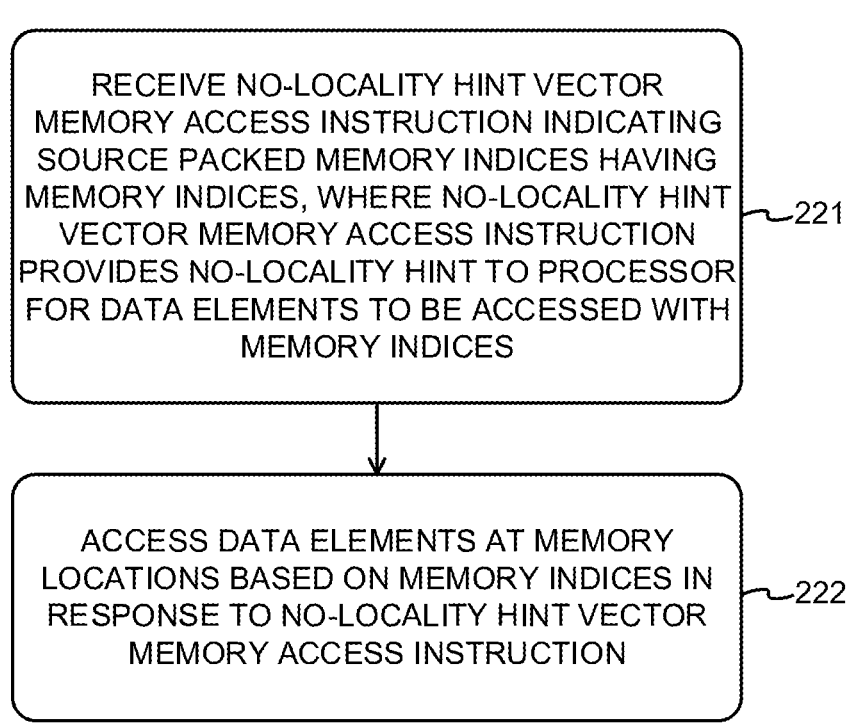
FIG. 2 is a block flow diagram of an embodiment of a method of processing an embodiment of a no-locality hint vector memory access instruction.

FIG. 2 is a block flow diagram of an embodiment of a method 220 of processing an embodiment of a no-locality hint vector memory access instruction. In various embodiments, the method may be performed by a processor, instruction processing apparatus, or other digital logic device.

The method includes receiving the no-locality hint vector memory access instruction, at block 221. In various aspects, the instruction may be received at a processor, or a portion thereof (e.g., an instruction fetch unit, a decode unit, etc.). In various aspects, the instruction may be received from an off-die source (e.g., from memory, interconnect, etc.), or from an on-die source (e.g., from an instruction cache, instruction queue, etc.). The no-locality hint vector memory access instruction may specify or otherwise indicate a source packed memory indices having a plurality of memory indices. In some embodiments, the no-locality hint vector memory access instruction may provide a no-locality hint to the processor for data elements that are to be accessed with the memory indices.

The data elements may be accessed at memory locations that are based on the memory indices in response to the no-locality hint vector memory access instruction, at block 222. In some embodiments, the method may include any of the operations shown or described below for any of FIGS. 3-8.

Figure 3:
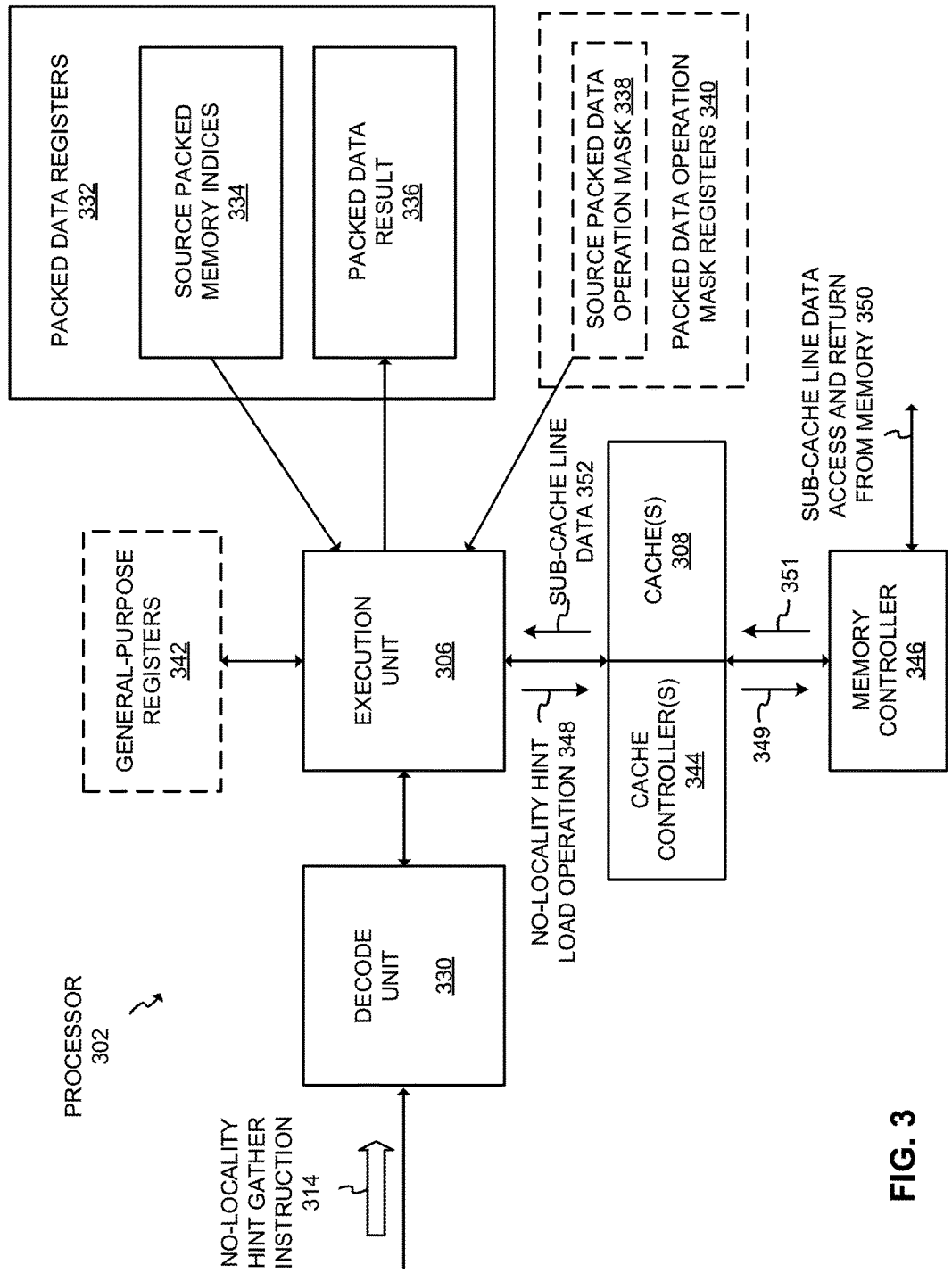
FIG. 3 is a block diagram of an embodiment of a processor that is operable to perform an embodiment of a no-locality hint gather instruction.

FIG. 3 is a block diagram of an embodiment of a processor 302 that is operable to perform an embodiment of a no-locality hint gather instruction 314. The no-locality hint gather instruction may also be referred to herein as a no-locality hint vector load instruction. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, graphics processors, network processors, communications processors, cryptographic processors, co-processors, embedded processors, digital signal processors (DSPs), and controllers (e.g., microcontrollers). The processor may be any of various complex instruction set computing (CISC) processors, reduced instruction set computing (RISC) processors, very long instruction word (VLIW) processors, hybrids thereof, other types of processors, or may have a combination of different processors (e.g., in different cores).

During operation, the processor 302 may receive the embodiment of the no-locality hint gather instruction 314. For example, the no-locality hint gather instruction may be received from an instruction fetch unit, an instruction queue, or the like. The no-locality hint gather instruction may represent a macroinstruction, assembly language instruction, machine code instruction, or other instruction or control signal of an instruction set of the processor.

In some embodiments, the no-locality hint gather instruction may explicitly specify (e.g., through one or more fields or a set of bits), or otherwise indicate (e.g., implicitly indicate), a source packed memory indices 334. The instruction may also specify or otherwise indicate a destination operand or destination storage location (e.g., a destination packed data register) where a packed data result 336 is to be stored.

In some embodiments, if the no-locality hint gather instruction is optionally a masked or predicated instruction, then it may specify or otherwise indicate a source packed data operation mask 338, although this is not required. As shown, in some embodiments, the source packed data operation mask may be stored in a set of packed data operation mask registers 340, although this is not required. In other embodiments, the source packed data operation mask may be stored in another storage location or specified by the instruction (e.g., a field or immediate). As will be discussed further below, the source packed data operation mask may be used to mask, predicate, or conditionally control the gather operation.

Referring again to FIG. 3, the processor includes a decode unit or decoder 330. The decode unit may receive and decode the no-locality hint gather instruction 314. The decode unit may output one or more microinstructions, micro-operations, micro-code entry points, decoded instructions or control signals, or other relatively lower-level instructions or control signals that reflect, represent, and/or are derived from the no-locality hint gather instruction. The one or more lower-level instructions or control signals may implement the higher-level no-locality hint gather instruction through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the no-locality hint gather instruction being provided directly to the decode unit 330, an instruction emulator, translator, morpher, interpreter, or other instruction conversion module may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the no-locality hint gather instruction, which may be of a first instruction set, and may emulate, translate, morph, interpret, or otherwise convert the no-locality hint gather instruction into one or more corresponding or derived intermediate instructions or control signals, which may be of a second different instruction set. The one or more intermediate instructions or control signals of the second instruction set may be provided to a decode unit, which may decode them into one or more lower-level instructions or control signals executable by native hardware of the processor (e.g., one or more execution units).

Referring again to FIG. 3, the processor also includes a set of packed data registers 332. Each of the packed data registers may represent an on-die storage location that is operable to store packed data, vector data, or SIMD data. The packed data registers may represent architecturally-visible registers (e.g., an architectural register file) that are visible to software and/or a programmer and/or are the registers indicated by instructions of an instruction set to identify operands. These architectural registers are contrasted to other non-architectural or non-architecturally visible registers in a given microarchitecture (e.g., temporary registers, reorder buffers, retirement registers, etc.). The packed data registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

In some embodiments, the source packed memory indices 334 may optionally be stored in a first packed data register, and the packed data result 336 may optionally be stored in a second packed data register. Alternatively, other storage locations, may be used for one or more of these operands. Moreover, in some embodiments, a packed data register used for a source operand may optionally be reused as a destination operand (e.g., the packed data result 336 may optionally be written or stored over the source packed memory indices 334).

Referring again to FIG. 3, the execution unit 306 is coupled with the decode unit 330, the packed data registers 332, and optionally the packed data operation mask 338. The execution unit may receive the one or more decoded or otherwise converted instructions or control signals that represent and/or are derived from the no-locality hint gather instruction. The execution unit may also receive the source packed memory indices 334 which are indicated by the no-locality hint gather instruction. In some cases, the execution unit may also optionally be coupled with a set of general-purpose registers 342, for example, if the general-purpose registers are to provide information to be used to convert the memory indices to memory addresses (e.g., a base, scale, displacement, etc.).

The execution unit is operable in response to and/or as a result of the no-locality hint gather instruction (e.g., in response to one or more instructions or control signals decoded directly or indirectly (e.g., through emulation) from the instruction) to access locations in the memory indicated by the source packed memory indices 334. For example, such access may include gathering or otherwise loading data elements from locations in the memory indicated by the corresponding packed memory indices and storing them in a packed data result 336. In some embodiments, a masked gather operation may optionally be performed. In some embodiments, the execution unit may perform any of the operations shown and described for any of FIGS. 4-5, although the scope of the invention is not so limited.

In some embodiments, the gather operation may be implemented with a no-locality hint. In some embodiments, the gather operation may be implemented with a no-temporal locality hint. In other embodiments, the gather operation may be implemented with a no-spatial locality hint. In still other embodiments, the gather operation may be implemented with a no-temporal locality and no-spatial locality hint. The execution unit may provide no-locality hint load operations 348 to one or more cache controllers 344. In some embodiments, there may be a single cache level and single cache controller (e.g., an L1 cache controller). In other embodiments, there may be two or more cache controllers (e.g., an L1 cache controller, an L2 cache controller, and optionally an L3 cache controller).

In some embodiments, if a no-locality hint load operation 348 request for data has a no-spatial locality hint, and if the request hits in a cache 308, then the associated cache controller 344 may return a sub-cache line amount of data 352 from the cache 308. In various embodiments, the sub-cache line amount of data 352 may be only half a cache line (e.g., only 256-bits of a 512-bit cache line), only one quarter a cache line (e.g., only 128-bits), only one eighth a cache line (e.g., only 64-bits), or only a single data element (e.g., 1 128-bit, 64-bit, 32-bit, 16-bit, or 8-bit data element).

Conversely, if a no-locality hint load operation 348 request for data has a no-spatial locality hint, and if the request misses in all cache(s) 308, then a no-locality hint load operation 348 request for data may be sent to a memory controller 346. In some embodiments, the memory controller may perform a sub-cache line data access and return 350 from memory (e.g., external memory). As before, in various embodiments, the sub-cache line data access and return 350 may be only half a cache line (e.g., only 256-bits), only one quarter a cache line (e.g., only 128-bits), only one eighth a cache line (e.g., only 64-bits), or only a single data element (e.g., a 64-bit, 32-bit, 16-bit, or 8-bit data element). That is, the memory controller may load data from memory with a smaller sized access and data return than would ordinarily be used for a load operation without a no-locality hint (e.g., a load operation for a conventional gather instruction). As one specific example, only one of a pair of 256-bit bus signals usually used to access an entire 512-bit cache line amount of data may be sent from the memory controller to a dynamic random access memory (DRAM) with the one sent being the one that includes the desired data element. In some embodiments, the minimum sized access and data return that is sufficient to contain the desired data element may optionally be used. The memory controller may provide a sub-cache line data return 351 to the cache controller(s) 344. The cache controllers may provide a corresponding sub-cache line amount of data 352 to the execution unit. In other embodiments, sub-cache line amounts of data may be transmitted on some but not all of these interconnects.

Conventionally, if a whole cache line is being accessed, the lowest order bits of the address (e.g., the lowest order 6-bits of the address) may all be zeroes. In contrast, if only a portion of a cache line is being accessed, some or all of these lowest order bits may not all be zeroes but rather may be needed to specify the location of the desired data within the cache line (e.g., in one embodiment a location of a single 64-bit, 32-bit, 16-bit, or 8-bit data element within a 512-bit cache line). In some embodiments, a size of the data element may also need to be indicated in the memory access.

Advantageously, any one or more of the sub-cache line data access and return 350 and/or the sub-cache line data return 351 and/or the sub-cache line amount of data 352 may help to reduce wasted bandwidth on the associated interconnects. This in turn may help to improve processor speed and/or performance, especially in applications that (at least at times) tend to be memory access bandwidth bound. In such situations, the processor may be able to process data faster than the data can be obtained from memory. If the needed data could be obtained from the memory faster, then overall processor speed and/or performance could be improved. Using the available memory access bandwidth to access a greater proportion of data that is actually of interest, and a lesser proportion of "tag along" spatial locality assumption data, may offer an advantage when there is low actual spatial locality. Such smaller accesses may be appropriate when the data access has sufficiently low spatial locality. In addition, these smaller accesses may also help to reduce power consumption to return the desired data element.

In some embodiments, if a no-locality hint load operation 348 request for data has a no-temporal locality (e.g., non-temporal) hint, and if the request misses in a cache 308, then the associated cache controller 344 may not allocate storage space in the cache for the requested data as it normally would for a regular gather instruction (i.e., without a no-locality hint). If there are multiple cache levels, cache controllers for higher level caches (e.g., closer to the cores) may provide the request to cache controllers for lower level caches (e.g., farther from the cores). Upon cache misses, in some embodiments, each cache controller may similarly not allocate storage space in their associated caches for the requested data when it is returned from memory. In some embodiments, if the data is present in a lower level cache it may be returned to the execution unit 306 without being stored in any of the higher level cache(s). If the data is not present in any cache(s) 308, then the request for the data may be provided to the memory controller 346. The memory controller may retrieve the desired data from memory, optionally retrieving a sub-cache line amount of data 350 if the hint is also a no-spatial locality hint, or else retrieving an entire cache line amount of data if the hint is just a no-temporal locality hint. The memory controller may provide the retrieved data to the cache controller(s). In some embodiments, the cache controller(s) may provide the data to the execution unit 306 without storing the retrieved data in the cache(s). Advantageously, omitting storing the data in the cache(s) this may help to reduce cache pollution and/or may help to increase processor performance, and may be appropriate when the data access has sufficiently low temporal locality. Once the execution unit has received all the requested data elements, and placed them into the packed data result 336 (e.g., in a packed data register), it may signal completion of the instruction.

The execution unit and/or the processor may include specific or particular logic (e.g., transistors, integrated circuitry, or other hardware potentially combined with firmware (e.g., instructions stored in non-volatile memory) and/or software) that is operable to perform the no-locality hint gather operation in response to and/or as a result of the no-locality hint gather instruction. By way of example, the execution unit may include a gather execution unit, a gather and/or scatter execution unit, a memory execution unit, a memory access unit, a load unit, load and/or store unit, or the like.

Figure 4:
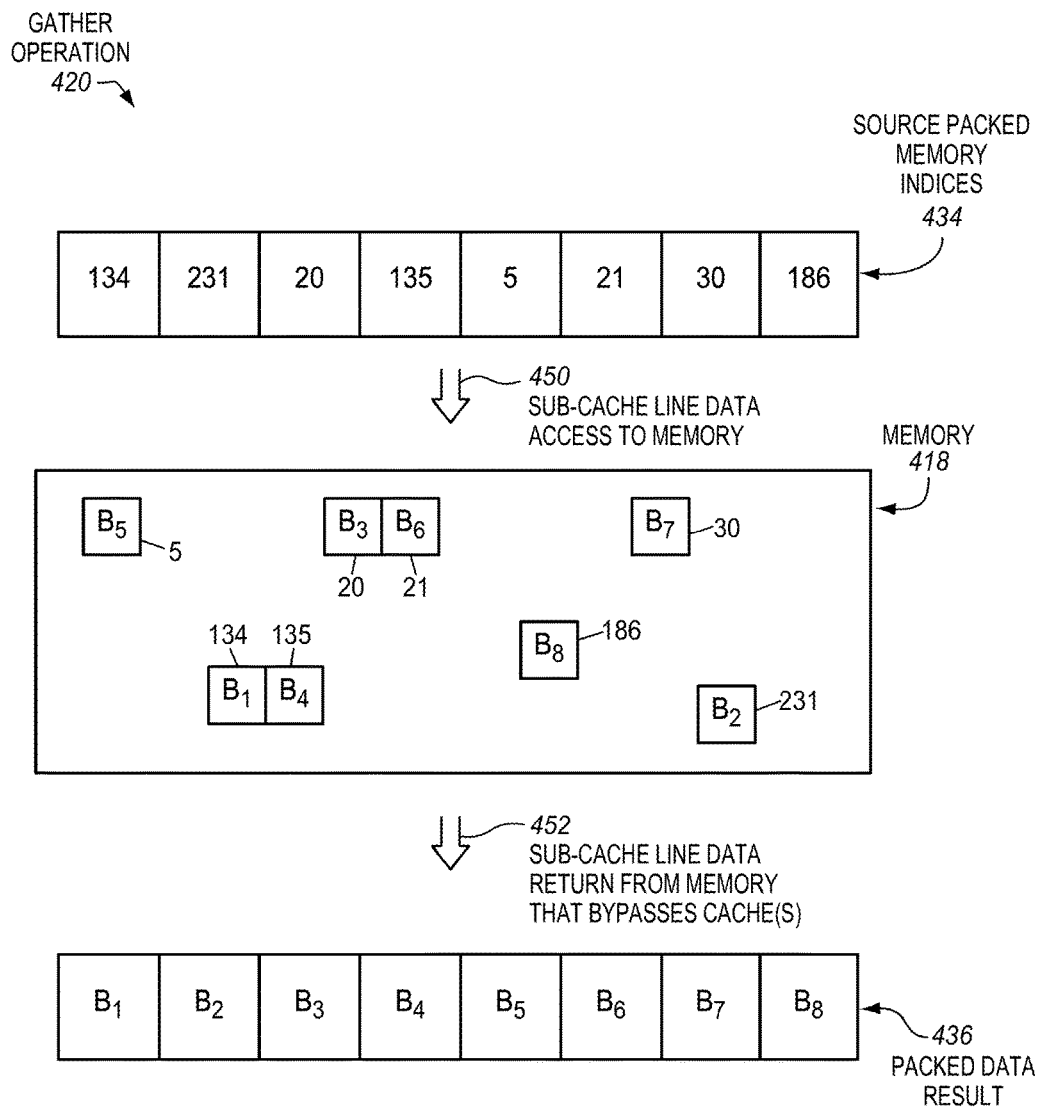
FIG. 4 is a block diagram of an embodiment of a gather operation that may be performed in response to an embodiment of a no-locality hint gather instruction.

FIG. 4 is a block diagram illustrating an embodiment of a gather operation 420 that may be performed in response to an embodiment of a no-locality hint gather instruction. The gather instruction may specify or otherwise indicate a source packed memory indices 434 having a plurality of packed memory indices. There are eight memory indices in the illustrated embodiment, although the scope of the invention is not so limited. In the illustrated example, the values of the memory indices are, from the least significant position (on the left) to the most significant position (on the right) right, 134, 231, 20, 135, 5, 21, 30 . . . 186. These values are only an example. Other embodiments may include either fewer or more memory indices. Commonly, the number of memory indices in the source packed memory indices may be equal to the size in bits of the source packed memory indices operand divided by the size in bits of each of the memory indices. In various embodiments, the width of the source packed memory indices operand may be 64-bits, 128-bits, 256-bits, 512-bits, or 1024-bits, although the scope of the invention is not so limited. In various embodiments, the size of each memory index may be 16-bits, 32-bits, or 64-bits, although the scope of the invention is not so limited. Other source packed memory indices widths and memory index sizes are also suitable.

The gather operation 420 may be performed, and a packed data result 436 may be stored in a destination storage location, in response to and/or as a result of the gather instruction. In one aspect, the gather instruction may specify or otherwise indicate the destination storage location. In some embodiments, the packed data result may include data elements that have been loaded or gathered from potentially non-contiguous memory locations in memory 418, which are indicated by the corresponding memory indices of the source packed memory indices 434. By way of example, a memory index may be converted into a memory address using a common scale and a common base (e.g., as memory address=memory index*scale+base). For example, in the illustrated embodiment, the memory index 134 may indicate the memory location storing data element B1, the memory index 231 may indicate the memory location storing data element B2, and so on.

In some embodiments, the gather operation may include a sub-cache line data access 450 to the memory 418. In some embodiments, the gather operation may include a sub-cache line data return 452 from the memory that bypasses the caches of the processor. Rather than accessing a full cache line (e.g., a 512-bit cache line), in various embodiments, the sub-cache line data access and return may access and return only one half a cache line (e.g., 256-bits), one quarter a cache line (e.g., 128-bits), one eighth a cache line (e.g., 64-bits), or a single data element (e.g., a 64-bit, 32-bit, 16-bit, or 8-bit data element). In some embodiments, the data returned may not be stored in any caches of the processor.

In the illustrated embodiment the packed data result includes eight data elements, although the scope of the invention is not so limited. Other embodiments may include either fewer or more result data elements. Commonly, the number of result data elements may be equal to the width in bits of the packed data result divided by the size in bits of each result data element and/or equal to the number of memory indices in the source packed memory indices. In various embodiments, the width of the packed data result may be 64-bits, 128-bits, 256-bits, 512-bits, or 1024-bits, although the scope of the invention is not so limited. In various embodiments, the size of each result data element may be 16-bits, 32-bits, or 64-bits, although the scope of the invention is not so limited. In the illustrated example, the packed data result stores, from the least significant position (on the left) to the most significant position (on the right) right, the data elements B1 through B8.

Figure 5:
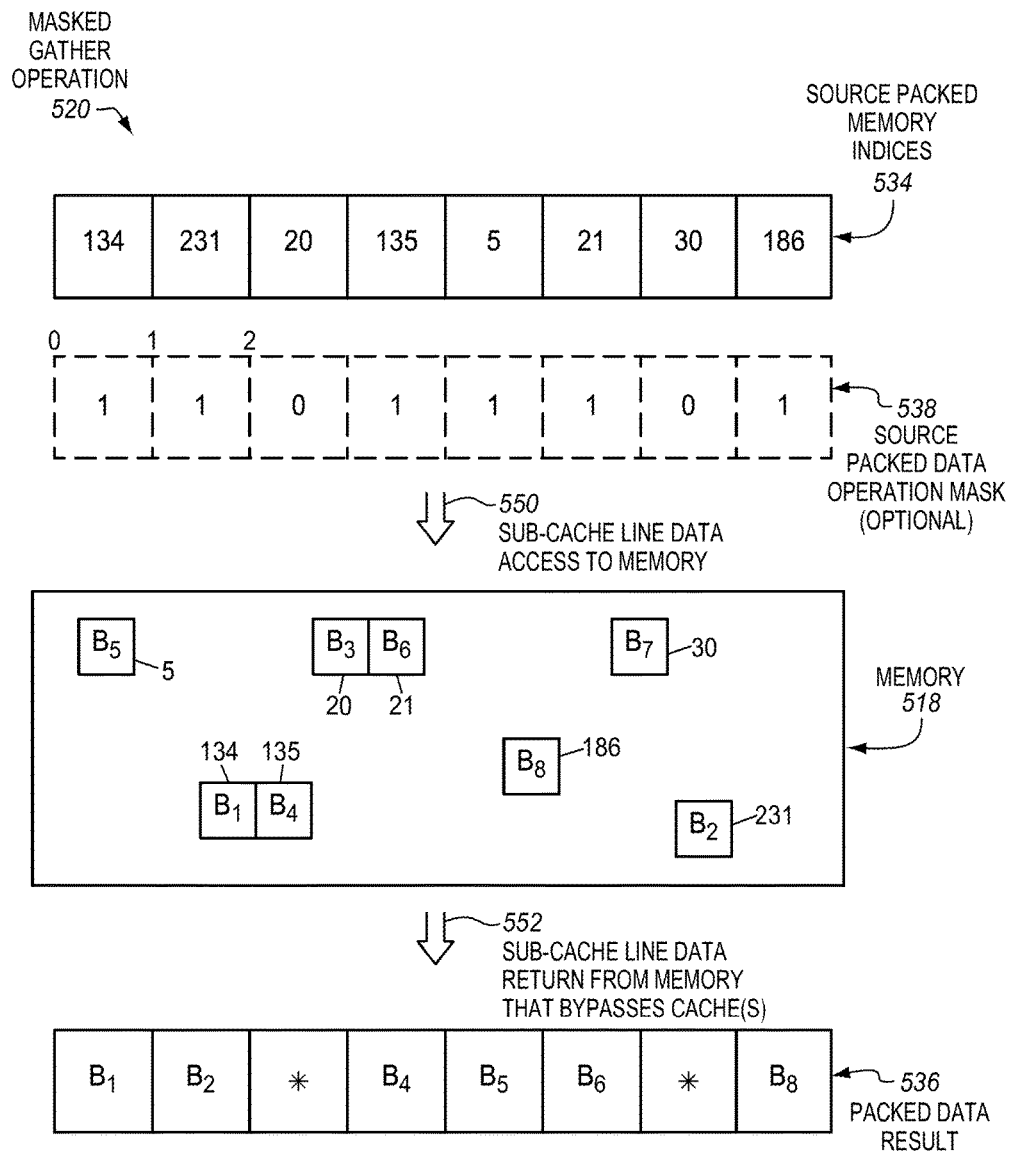
FIG. 5 is a block diagram of an embodiment of a masked gather operation that may be performed in response to an embodiment of a no-locality hint masked gather instruction.

FIG. 5 is a block diagram illustrating an embodiment of a masked gather operation 520 that may be performed in response to an embodiment of a masked no-locality hint gather instruction. The masked operation of FIG. 5 has similarities to the unmasked operation of FIG. 4. To avoid obscuring the description, the different and/or additional characteristics for the masked operation of FIG. 5 will primarily be described without repeating all the similar or common characteristics relative to the unmasked operation of FIG. 4. However, the previously described characteristics of the unmasked operation of FIG. 4 also optionally apply to the masked operation of FIG. 5, unless stated or otherwise clearly apparent.

The masked gather instruction may specify or otherwise indicate a source packed memory indices 534 having a plurality of packed memory indices. The source packed memory indices, as well as the memory indices, may be similar to, or the same as, those described for FIGS. 3-4, and may have the same variations and alternatives.

The masked gather instruction may additionally specify (e.g., explicitly specify) or otherwise indicate (e.g., implicitly indicate) a source packed data operation mask 538. The packed data operation mask may also be referred to herein simply as an operation mask, predicate mask, or mask. The mask may represent a predicate operand or conditional control operand that may be used to predicate, conditionally control, or mask whether or not corresponding operations are to be performed and/or corresponding results are to be stored. In some embodiments, the masking or predication may be at per-data element granularity such that operations on different pairs of corresponding data elements may be predicated or conditionally controlled separately and/or independently of others. The mask may include multiple mask elements, predicate elements, or conditional control elements. In one aspect, the mask elements may be included in a one-to-one correspondence with corresponding memory indices of source packed memory indices and/or corresponding result data elements of result packed data. For example, the corresponding mask elements, memory indices, and result data elements may occupy same relative positions within the operands.

As shown, in some embodiments, each mask element may be a single mask bit. In such cases, the mask may have a bit for each memory index and/or each result data element. In the example of the source packed memory indices having eight memory indices, and in the case of each mask element being a single bit, the packed data operation mask may be 8-bits wide with each bit representing a predicate or mask bit that corresponds to a memory index in a same relative operand position. For example, in the illustration the corresponding positions are in vertically alignment above one another. A value of each mask bit may control whether or not a corresponding gather or load operation is to be performed and/or a corresponding result data element is to be stored. Each mask bit may have a first value to allow the gather or load operation to be performed using the corresponding memory index and allow the corresponding result data element to be stored in the result packed data, or may have a second different value to not allow the gather or load operation to be performed using the corresponding memory index and/or not allow the corresponding result data element to be stored in the result packed data. According to one possible convention, as shown in the illustration, a mask bit cleared to binary zero (i.e., 0) may represent a masked out operation for which a result data element is not to be stored, whereas a mask bit set to binary one (i.e., 1) may represent an unmasked operation for which a gathered result data element is to be stored. In the illustrated example, the mask bits, from least significant bit position (on the left) to most significant bit position (on the right), are 1, 1, 0, 1, 1, 1, 0 . . . 1. This is just one illustrative example. In other embodiments, two or more bits may optionally be used for each mask element (e.g., each mask element may have a same number of bits as each corresponding source data element and either all bits or as few as a single bit may be used to determine the masking).

The masked gather operation 520 may be performed, and a packed data result 536 may be stored, in response to and/or as a result of the masked gather instruction. The packed data result may be similar to, or the same as, that described for FIG. 4, and may have the same variations and alternatives. In one aspect, the packed data result may be stored in a destination storage location indicated by the masked gather instruction. The masked gather operation may load or gather data elements from potentially non-contiguous locations in a memory 518 indicated by the corresponding memory indices subject to the masking, predication, or conditional control of the source packed data operation mask 538. In some embodiments, data may only be gathered and stored into the corresponding result data element if the corresponding mask bit in the packed data operation mask is unmasked (e.g., in the illustration set to binary 1). In contrast, the result data elements corresponding to masked-out mask elements may have predetermined values not based on the gather operation. For example, either the corresponding gather operation need not be performed, or if the corresponding gather operation is performed then the corresponding gathered data element need not be stored in the corresponding result data element. Rather, a fixed or predetermined value may be stored in the corresponding result data element. In the illustrated example, the result data elements corresponding to masked-out mask elements (having a value of zero in the illustrated example) have an asterisk (*) to represent such fixed or predetermined values. The particular fixed or predetermined values may depend on the type of masking used for the particular implementation. In some embodiments, zeroing masking may be used. In zeroing masking, the masked-out result data elements may be zeroed-out (e.g., be forced to have a value of zero). Alternatively, other predetermined values may optionally be stored in these masked-out result data elements. In the illustrated example, the packed data result in the destination stores, from the least significant position (on the left) to the most significant position (on the right) right, the data elements B1, B2, *, B4, B5, B6, *, B8.

In some embodiments, the masked gather operation may include a sub-cache line data access 550 to the memory 518. In some embodiments, the gather operation may include a sub-cache line data return 552 from the memory that bypasses the caches of the processor. Rather than accessing a full cache line (e.g., a 512-bit cache line), in various embodiments, the sub-cache line data access and return may access and return only one half a cache line (e.g., 256-bits), one quarter a cache line (e.g., 128-bits), one eighth a cache line (e.g., 64-bits), or a single data element (e.g., a 64-bit, 32-bit, 16-bit, or 8-bit data element). In some embodiments, the data returned may not be stored in any caches of the processor.

Figure 6:
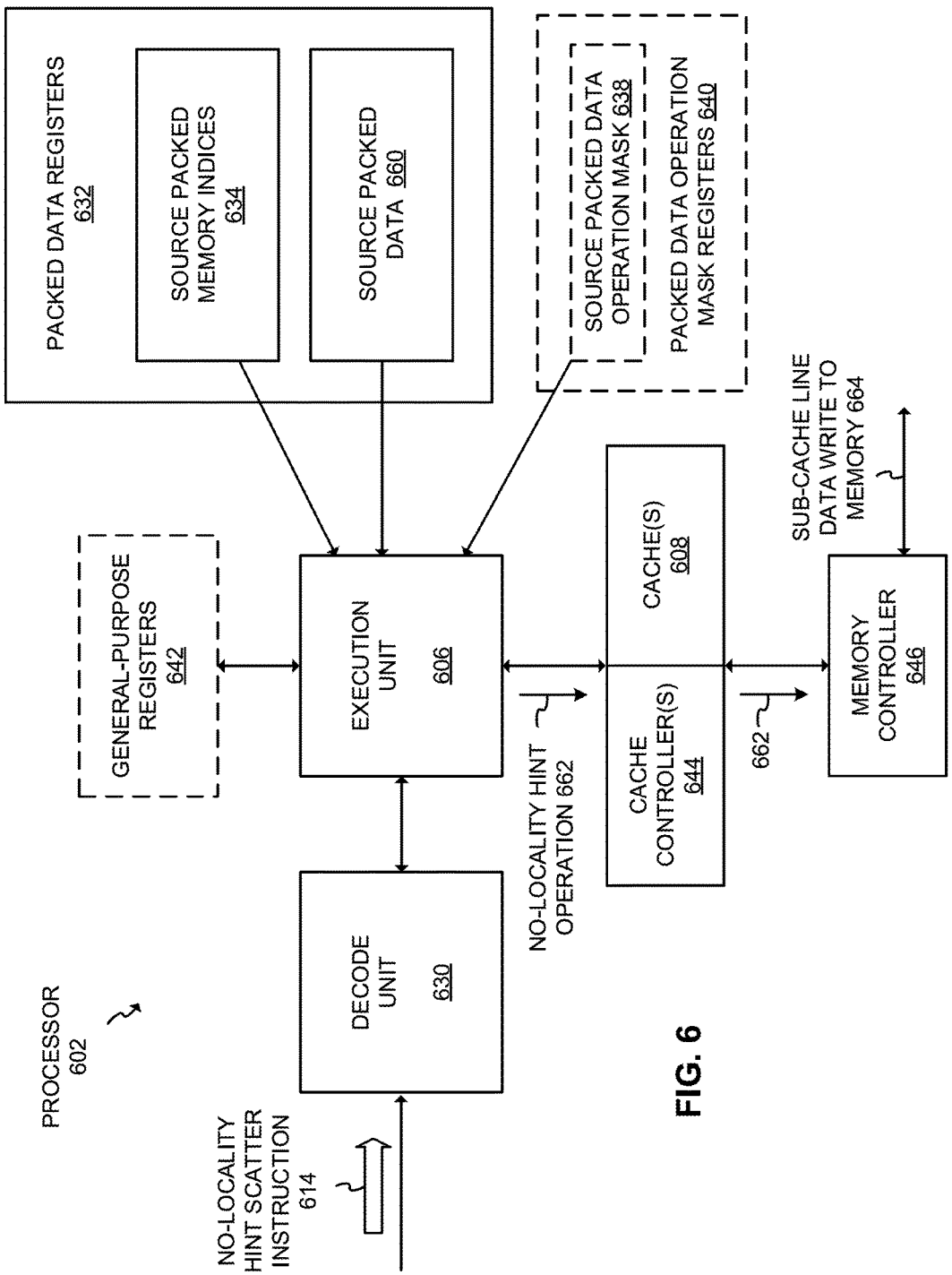
FIG. 6 is a block diagram of an embodiment of a processor that is operable to perform an embodiment of a no-locality hint scatter instruction.

FIG. 6 is a block diagram of an embodiment of a processor 602 that is operable to perform an embodiment of a no-locality hint scatter instruction 614. The no-locality hint scatter instruction may also be referred to herein as a no-locality hint vector store or write instruction. The processor 602 includes a decode unit 630, an execution unit 606, packed data registers 632, a source packed memory indices 634, packed data operation mask registers 640, a source packed data operation mask 638, general-purpose registers 642, one or more cache controllers 644, one or more caches 608, and a memory controller 646. Unless otherwise specified, except for performing a scatter instruction instead of a gather instruction, the processor 602 and the aforementioned components may optionally have some or all of the characteristics, variations, and alternatives of the processor 302 and correspondingly named components of FIG. 3. To avoid obscuring the description, the different and/or additional characteristics will primarily be described without repeating all of the common characteristics and possible variations.

During operation, the processor 602 may receive the embodiment of the no-locality hint scatter instruction 614. The no-locality hint scatter instruction may represent a macroinstruction, assembly language instruction, machine code instruction, or other instruction or control signal of an instruction set of the processor. In some embodiments, the no-locality hint scatter instruction may explicitly specify or otherwise indicate both the source packed memory indices 634 and the source packed data 660. In some embodiments, the source packed memory indices may optionally be stored in a first packed data register, and the source packed data may optionally be stored in a second packed data register. In some embodiments, if the no-locality hint scatter instruction is optionally a masked or predicated instruction, it may also specify or otherwise indicate a source packed data operation mask 638, although this is not required.

The decode unit 630 may decode the no-locality hint scatter instruction 614. The execution unit 606 is coupled with the decode unit 630, the packed data registers 632, and optionally the source packed data operation mask 638 (e.g., the mask registers 640). The execution unit may receive the source packed memory indices 634 and the source packed data 660. The execution unit is operable in response to and/or as a result of the no-locality hint scatter instruction (e.g., in response to one or more instructions or control signals decoded from the instruction) scatter, store, or write data elements from the source packed data 660 to locations in memory indicated by the corresponding packed memory indices of the source packed memory indices 634. In some embodiments, a masked scatter operation may optionally be performed. In some embodiments, the execution unit may perform any of the operations shown and described for any of FIGS. 7-8, although the scope of the invention is not so limited. The execution unit and/or the processor may include specific or particular logic (e.g., transistors, integrated circuitry, or other hardware potentially combined with firmware (e.g., instructions stored in non-volatile memory) and/or software) that is operable to perform the no-locality hint scatter operation in response to and/or as a result of the no-locality hint scatter instruction. By way of example, the execution unit may include a scatter execution unit, a gather and/or scatter execution unit, a memory execution unit, a memory access unit, a store unit, a load and store unit, or the like.

In some embodiments, the scatter operation may be implemented with a no-locality hint. In some embodiments, the scatter operation may be implemented with a no-temporal locality hint. In other embodiments, the scatter operation may be implemented with a no-spatial locality hint. In still other embodiments, the scatter operation may be implemented with a no-temporal locality and no-spatial locality hint. The execution unit may provide no-locality hint store or write operations 662 to one or more cache controllers 644. In some embodiments, there may be a single cache level and single cache controller (e.g., an L1 cache controller). In other embodiments, there may be two or more cache controllers (e.g., an L1 cache controller, an L2 cache controller, and optionally an L3 cache controller).

There are various ways in which a no-temporal locality hint may be applied for a scatter instruction. Consider first a scenario where a scatter operation hits in a lower-level cache (e.g., an L2 or L3 cache). One possible way to implement a conventional scatter instruction without a no-temporal locality hint would be to read the cache line having the hitting data element from the lower-level cache into a higher-level cache (e.g., an L1 cache). Then a write may be performed to replace the data element in the higher-level cache (e.g., the L1 cache). However, one possible drawback to this approach is that it may cause non-temporal data to be brought higher up in the cache hierarchy and/or closer to the processor. In some embodiments, an alternate approach may be performed in response to the embodiment of no-temporal locality hint scatter instruction. For example, in some embodiments, upon the scatter operation hitting on the lower-level cache (e.g., the L2 or L3 cache), instead of transferring the cache line having the hitting data element to the higher-level cache (e.g., the L1 cache), the data element may be kept in the lower-level cache (e.g., the L2 or L3 cache) and the write may be performed to replace the data element in the lower-level cache. This approach may avoid bringing the non-temporal data element higher up in the cache hierarchy and/or closer to the cores. In some embodiments, upon the scatter operation hitting in a cache (e.g., an L1 cache, an L2 cache, or an L3 cache), the corresponding cache line having the data element may be evicted from the cache to a lower-level cache or evicted from all of the caches to memory. Then the write may be performed to memory to replace the data element. In another embodiment, this may be just one more piece of information in a cache line eviction algorithm or replacement policy.

If a no-locality hint scatter or store operation 662 has a no-spatial locality hint, and if the request misses in the cache(s) 608, then the associated operation may be provided to the memory controller 646. In some embodiments, the memory controller may perform a sub-cache line sized scatter, write, or store operation 664 to memory. In various embodiments, the sub-cache line sized scatter, write, or store operation 664 may be only half a cache line (e.g., only 256-bits), only one quarter a cache line (e.g., only 128-bits), only one eighth a cache line (e.g., only 64-bits), or only a single data element (e.g., a 64-bit, 32-bit, 16-bit, or 8-bit data element). That is, the memory controller may write data to the memory with a smaller sized write than would ordinarily be used for a write operation without a no-locality hint (e.g., a write operation for a conventional scatter instruction). As one specific example, only one of a pair of 256-bit bus write signals usually used to write an entire 512-bit cache line amount of data may be transmitted from the memory controller to a DRAM with the one transmitted being the one that includes the desired data element. In some embodiments, the minimum sized write that is sufficient to replace the desired data element may optionally be used. Advantageously, such smaller writes may help to reduce wasted bandwidth on the associated interconnects. In addition, these smaller writes may also help to reduce power consumption.

Figure 7:
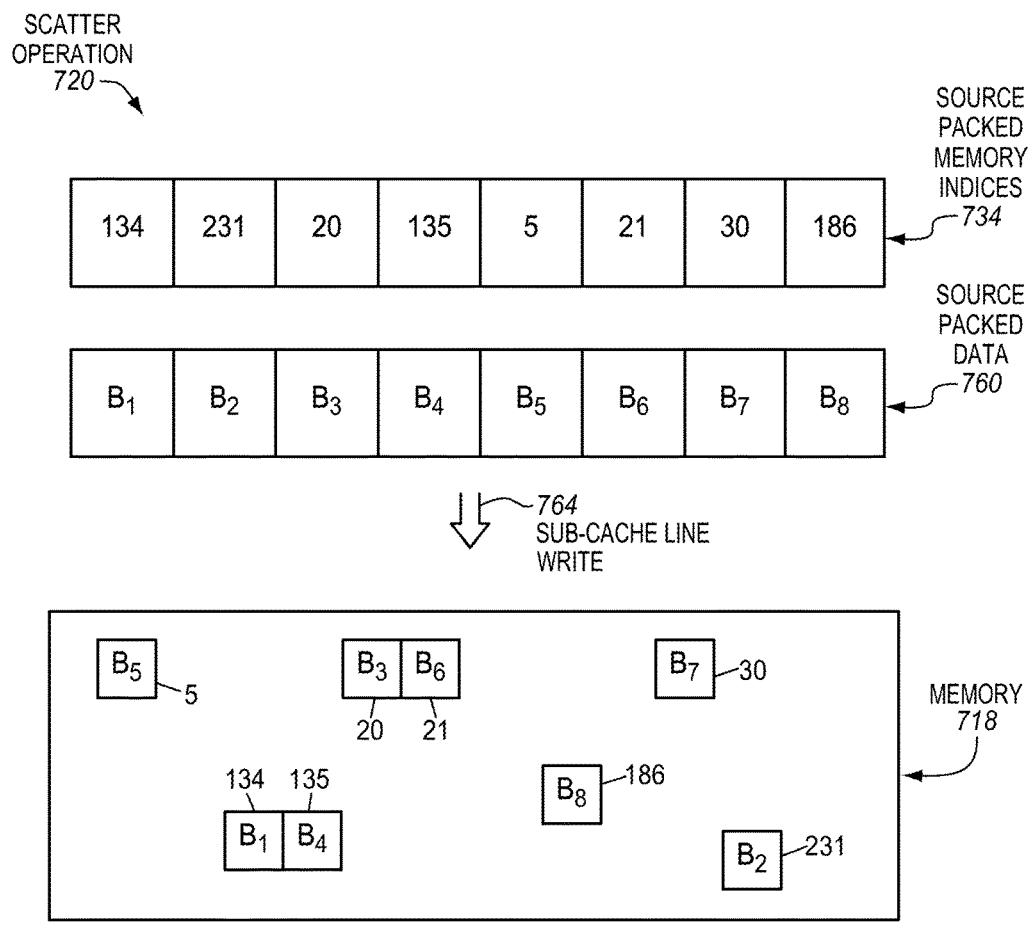
FIG. 7 is a block diagram of an embodiment of a scatter operation that may be performed in response to an embodiment of a no-locality hint scatter instruction.

FIG. 7 is a block diagram illustrating an embodiment of a scatter operation 720 that may be performed in response to an embodiment of a no-locality hint scatter instruction. The scatter instruction may specify or otherwise indicate a source packed memory indices 734 having a plurality of packed memory indices. The source packed memory indices, as well as the memory indices, may be similar to, or the same as, those described for FIG. 4, and may have the same variations and alternatives.

The scatter instruction may also specify or otherwise indicate a source packed data 660 having a plurality of packed data elements that are to be scattered or written to memory. There are eight packed data elements, labeled B1 through B8, in the source packed data in the illustrated embodiment, although the scope of the invention is not so limited. Other embodiments may include either fewer or more data elements to be scattered. Commonly, the number of data elements to be scattered may be equal to the number of memory indices in the source packed memory indices. Each data element to be scattered may correspond to a different one of the memory indices (e.g., in a same relative position within the operands). In various embodiments, the width of the source packed data may be 64-bits, 128-bits, 256-bits, 512-bits, or 1024-bits, although the scope of the invention is not so limited. In various embodiments, the size of each data element in the source packed data 760 may be 16-bits, 32-bits, or 64-bits, although the scope of the invention is not so limited. Other source packed data widths and data element sizes are also suitable.

The scatter operation 720 may be performed in response to and/or as a result of the scatter instruction. The scatter operation may store, write, or scatter data elements from the source packed data 760 to locations in a memory 718 that are indicated by the corresponding memory indices in source packed memory indices 734. The data elements may be scattered or written to locations in the memory indicated by and/or derived from the memory indices. In some embodiments, the data elements may be scattered to optionally/potentially non-contiguous memory locations. For example, in the illustrated embodiment, the memory index 134 points to the memory location where the data element B1 is to be written, and so on. In some embodiments, the scattering may be ordered across the source packed data, such as, for example, from a lowest order bit position (on the left as viewed) to a highest order bit position (on the right as viewed). In some embodiments, the no-locality hint scatter operation may include a sub-cache line data write 764 to the memory 718.

Figure 8:
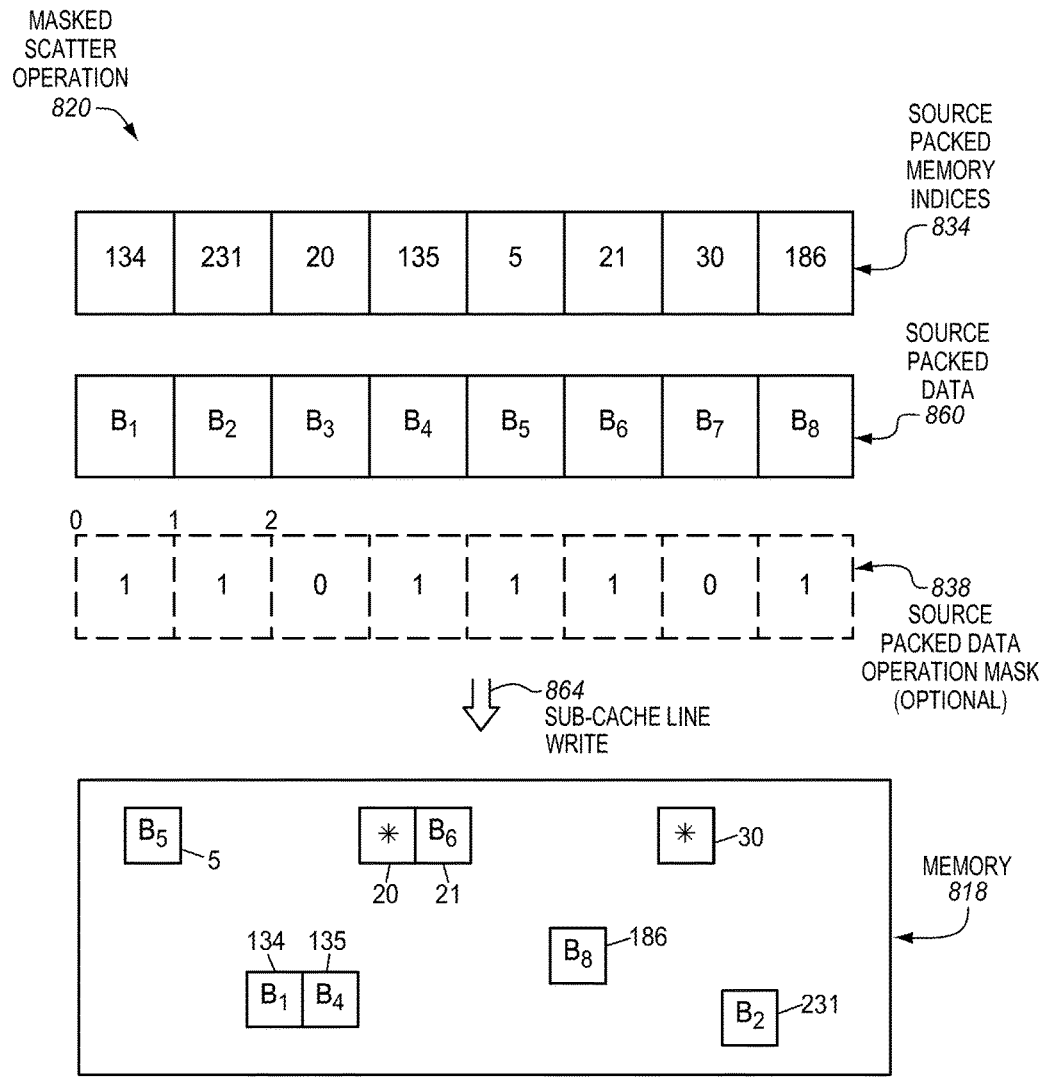
FIG. 8 is a block diagram of an embodiment of a masked scatter operation that may be performed in response to an embodiment of a masked no-locality hint scatter instruction.

FIG. 8 is a block diagram illustrating an embodiment of a masked scatter operation 820 that may be performed in response to an embodiment of a masked no-locality hint scatter instruction. The masked operation of FIG. 8 has similarities to the unmasked operation of FIG. 7. To avoid obscuring the description, the different and/or additional characteristics for the masked operation of FIG. 8 will primarily be described without repeating all the similar or common characteristics relative to the unmasked operation of FIG. 7. However, the previously described characteristics of the unmasked operation of FIG. 7 also optionally apply to the masked operation of FIG. 8, unless stated or otherwise clearly apparent.

The masked scatter instruction may specify or otherwise indicate a source packed memory indices 834 having a plurality of packed memory indices. The source packed memory indices, as well as the memory indices, may be similar to, or the same as, those described for FIGS. 3-4 and/or 7, and may have the same variations and alternatives.

The masked scatter instruction may also specify or otherwise indicate a source packed data 860 having a plurality of packed data elements. The source packed data, as well as the data elements therein, may be similar to, or the same as, those described for FIG. 6-7, and may have the same variations and alternatives.

The masked scatter instruction may additionally specify (e.g., explicitly specify) or otherwise indicate (e.g., implicitly indicate) a source packed data operation mask 838 having a plurality of mask bits or other mask elements. The source packed data operation mask, as well as the mask bits or mask elements therein, except that they may be used to mask scatter operations instead of gather operations, may be similar to, or the same as, those described for FIG. 5, and may have the same variations and alternatives. The mask elements may be included in a one-to-one correspondence with corresponding memory indices of source packed memory indices and/or corresponding data elements of source packed data (e.g., may occupy same relative positions within the operands). A value of each mask bit or mask element may control whether or not a corresponding scatter or write operation is to be performed for a corresponding data element of the source packed data. Each mask bit may have a first value to allow the scatter operation to be performed using the corresponding memory index and source data element, or may have a second different value to not allow the scatter operation to be performed using the corresponding memory index and source data element.

The masked scatter operation 820 may be performed in response to and/or as a result of the masked scatter instruction subject to the predication or conditional control of the source packed data operation mask 838. The scatter operation may store, write, or scatter data elements from the source packed data 860 to potentially/optionally non-contiguous locations in a memory 818 indicated by and/or derived from the corresponding memory indices subject to the masking, predication, or conditional control of the source packed data operation mask 838. In some embodiments, data may only be scattered or stored to the memory location if the corresponding mask bit in the packed data operation mask is unmasked (e.g., in the illustration set to binary 1). In contrast, memory locations corresponding to masked-out mask elements may have preexisting values not changed by the scatter operation (e.g., the same value as in the memory location before execution of the masked scatter instruction). In the illustrated example, the memory locations corresponding to masked-out mask elements (having values of zero in the illustrated example) have an asterisk (*) to represent such preexisting values. In some embodiments, the no-locality hint scatter operation may include a sub-cache line data write 864 to the memory 818.

In some embodiments, an instruction format may include an operation code or opcode. The opcode may represent a plurality of bits or one or more fields that are operable to identify the instruction and/or the operation to be performed (e.g., a sort index operation). Depending upon the particular instruction, the instruction format may also include one or more source and/or destination specifiers. By way of example, each of these specifiers may include bits or one or more fields to specify an address of a register, memory location, or other storage location, as described elsewhere herein. Alternatively, instead of such an explicit specifier, one or more sources and/or destinations may optionally be implicit to the instruction instead of being explicitly specified. In addition, a source may be implicitly reused as a destination in some cases (e.g., for a gather instruction of some embodiments). In addition, the instruction format may optionally add additional fields, may overlap certain fields, etc. Fields need not include contiguous sequences of bits but rather may be composed of non-contiguous or separated bits.

In some embodiments, a no-locality hint vector memory access instruction may optionally have a different opcode than a vector memory access instruction without the no-locality hint. For example, a no-locality hint gather instruction may have a different opcode than a gather instruction without the no-locality hint. In some embodiments, different opcodes may optionally be provided for no-spatial locality hint and no-temporal locality hint vector memory access instructions. For example, a no-spatial locality hint gather instruction, a no-temporal locality hint gather instruction, a no-spatial locality hint scatter instruction, and a no-temporal locality hint scatter instruction may all have different opcodes. In other embodiments, a no-locality hint vector memory access instruction may share an opcode with a vector memory access instruction without a no-locality hint. For example, a no-locality hint gather instruction may share an opcode with a gather instruction without a no-locality hint, and these instructions may include one or more bits to indicate whether or not the instruction is to be decoded to have a no-locality hint. As another example, a no-locality hint scatter instruction may share an opcode with a scatter instruction without a no-locality hint, and these instructions may include one or more bits to indicate whether or not the instruction is to be decoded to have a no-locality hint. In some embodiments, a single bit may have a first value (e.g., 1) to indicate a no-locality hint or a second value (e.g., 0) to indicate lack of a no-locality hint. In other embodiments, two bits may have different values to indicate whether or not there is a no-locality hint and what type the no-locality hint is. For example, these two bits may have a first value (e.g., 00) to indicate that there is not a no-locality hint, a second value (e.g., 01) to indicate that there is a no-spatial locality hint, a third value (e.g., 10) to indicate that there is a no-temporal locality hint, and a fourth value (e.g., 11) to indicate that there is a no-spatial and no-temporal locality hint. In some embodiments, a no-locality hint vector memory access instruction (e.g., a no-locality hint gather or scatter instruction) may have a weaker memory ordering model than a counterpart vector memory access instruction in the same instruction set that lacks the no-locality hint (e.g., conventional a gather or scatter instruction without the no-locality hint).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 9A illustrates an exemplary AVX instruction format including a VEX prefix 902, real opcode field 930, Mod R/M byte 940, SIB byte 950, displacement field 962, and IMM8 972. FIG. 9B illustrates which fields from FIG. 9A make up a full opcode field 974 and a base operation field 942. FIG. 9C illustrates which fields from FIG. 9A make up a register index field 944.

VEX Prefix (Bytes 0-2) 902 is encoded in a three-byte form. The first byte is the Format Field 940 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 905 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 915 (VEX byte 1, bits [4:0]—mmmmm) includes content to encode an implied leading opcode byte. W Field 964 (VEX byte 2, bit [7]—W)—is represented by the notation VEX.W, and provides different functions depending on the instruction. The role of VEX.vvvv 920 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 968 Size field (VEX byte 2, bit [2]—L)=0, it indicates 128 bit vector; if VEX.L=1, it indicates 256 bit vector. Prefix encoding field 925 (VEX byte 2, bits [1:0]—pp) provides additional bits for the base operation field.

Real Opcode Field 930 (Byte 3) is also known as the opcode byte. Part of the opcode is specified in this field.

MOD R/M Field 940 (Byte 4) includes MOD field 942 (bits [7-6]), Reg field 944 (bits [5-3]), and R/M field 946 (bits [2-0]). The role of Reg field 944 may include the following: encoding either the destination register operand or a source register operand (the rrr of Rrrr), or be treated as an opcode extension and not used to encode any instruction operand. The role of R/M field 946 may include the following: encoding the instruction operand that references a memory address, or encoding either the destination register operand or a source register operand.

Scale, Index, Base (SIB)—The content of Scale field 950 (Byte 5) includes SS952 (bits [7-6]), which is used for memory address generation. The contents of SIB.xxx 954 (bits [5-3]) and SIB.bbb 956 (bits [2-0]) have been previously referred to with regard to the register indexes Xxxx and Bbbb.

The Displacement Field 962 and the immediate field (IMM8) 972 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
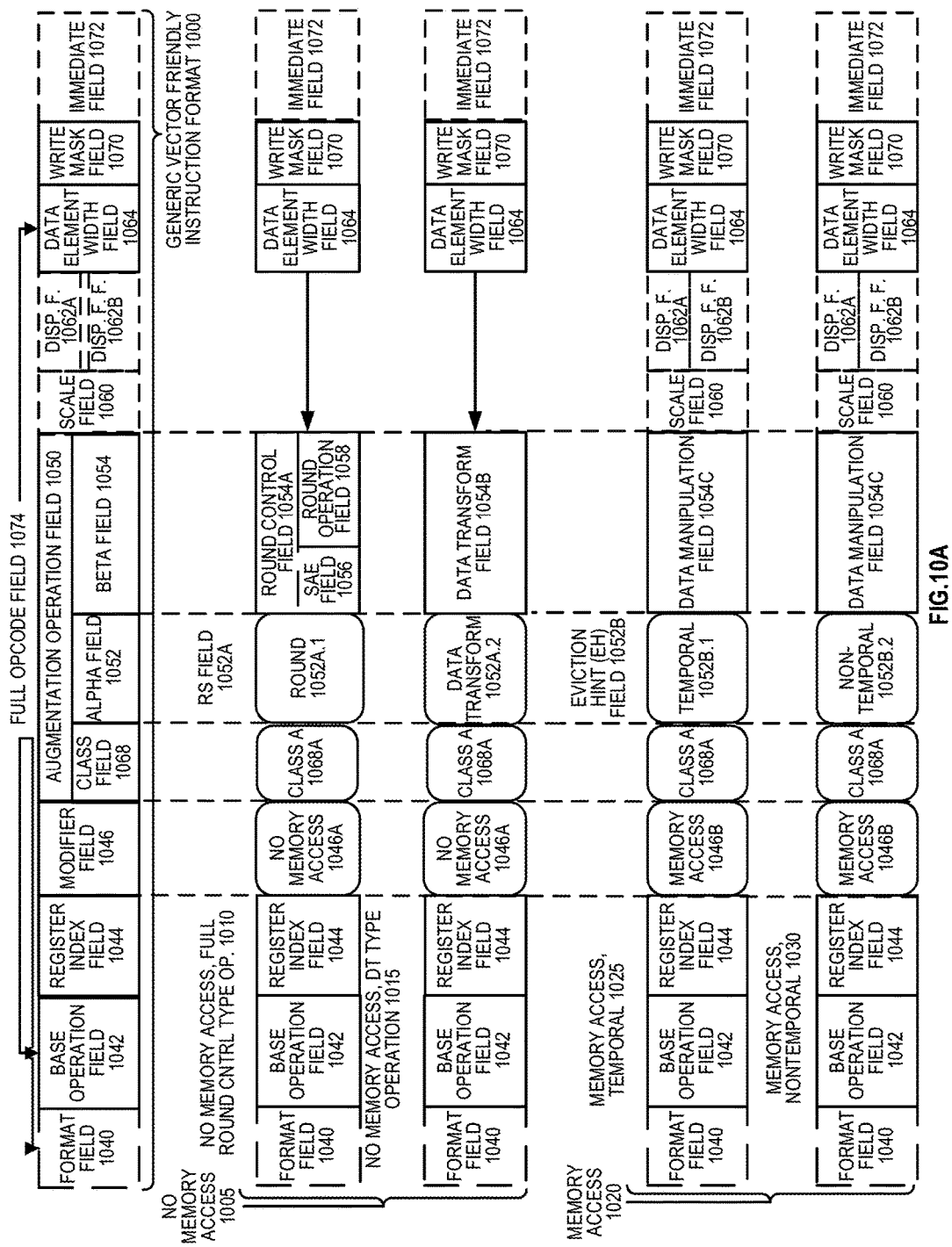
FIG. 10A-B is a block diagram illustrating an exemplary specific vector friendly instruction format and an opcode field, according to embodiments of the invention.
Figure 10B:
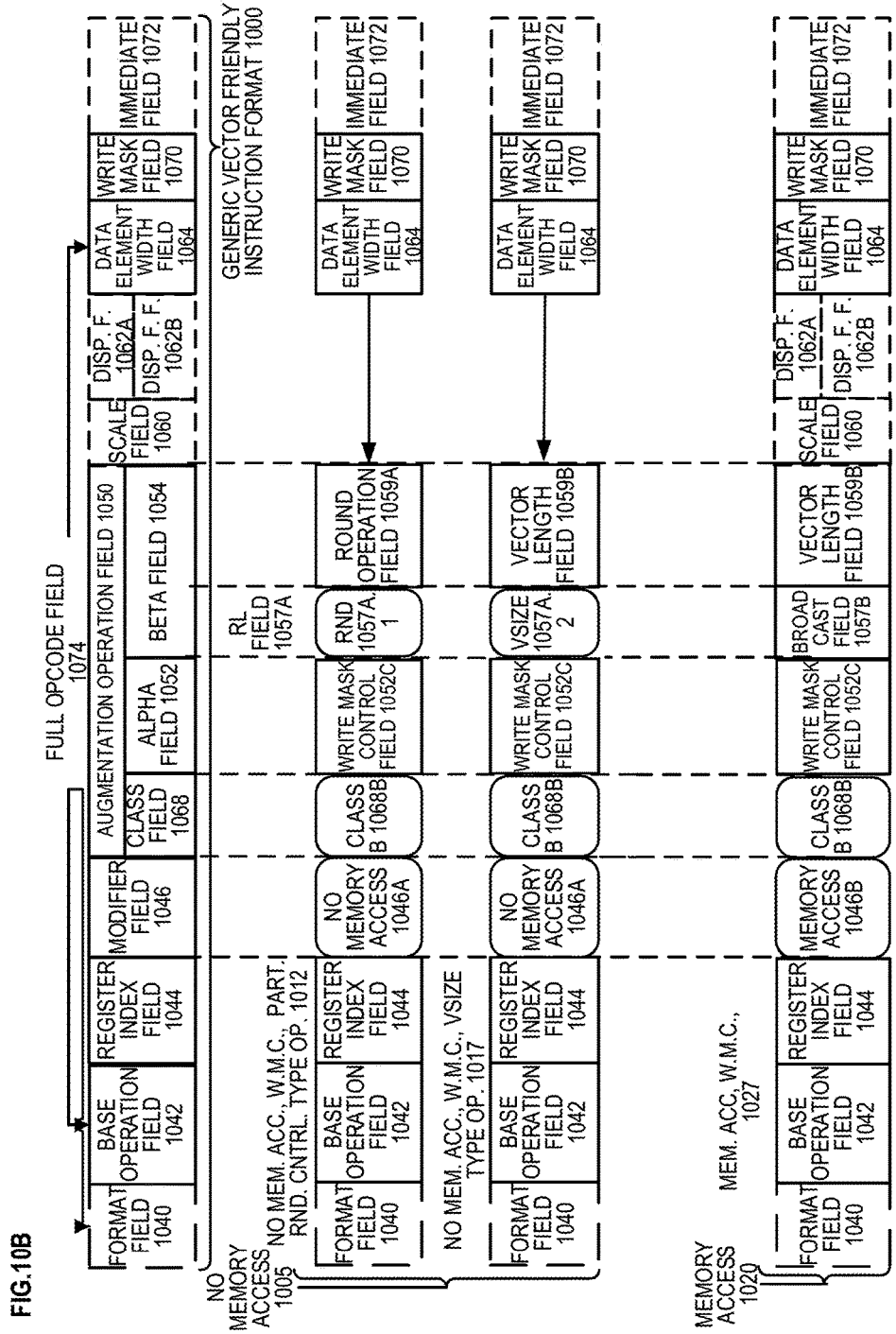

FIGS. 10A-10B are block diagrams illustrating a generic vector friendly instruction format and instruction templates thereof according to embodiments of the invention. FIG. 10A is a block diagram illustrating a generic vector friendly instruction format and class A instruction templates thereof according to embodiments of the invention; while FIG. 10B is a block diagram illustrating the generic vector friendly instruction format and class B instruction templates thereof according to embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the invention, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}$*index+base).

Displacement Field 1062A—its content is used as part of memory address generation (e.g., for address generation that uses $2^{scale}$*index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the invention where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector Memory Instructions Perform Vector Loads from and Vector Stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one embodiment of the invention where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according to embodiments of the invention. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in one embodiment of the invention).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]—vvvv)—the role of EVEX.vvvv may include the following: 1) EVEX.vvvv encodes the first source register operand, specified in inverted (i s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (is complement) form. Depending on the instruction, an extra different EVEX bit field is used to extend the specifier size to 32 registers.

EVEX.U 1068 Class field (EVEX byte 2, bit [2]—U)—If EVEX.0=0, it indicates class A or EVEX.U0; if EVEX.0=1, it indicates class B or EVEX.U1.

Prefix encoding field 1125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]—SSS, also known as EVEX.$s_{2-0}$, EVEX.$r_{2-0}$, EVEX.rrl, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1072 operates as previously described.

Full Opcode Field

FIG. 11B is a block diagram illustrating the fields of the specific vector friendly instruction format 1100 that make up the full opcode field 1074 according to one embodiment of the invention. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one embodiment of the invention. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
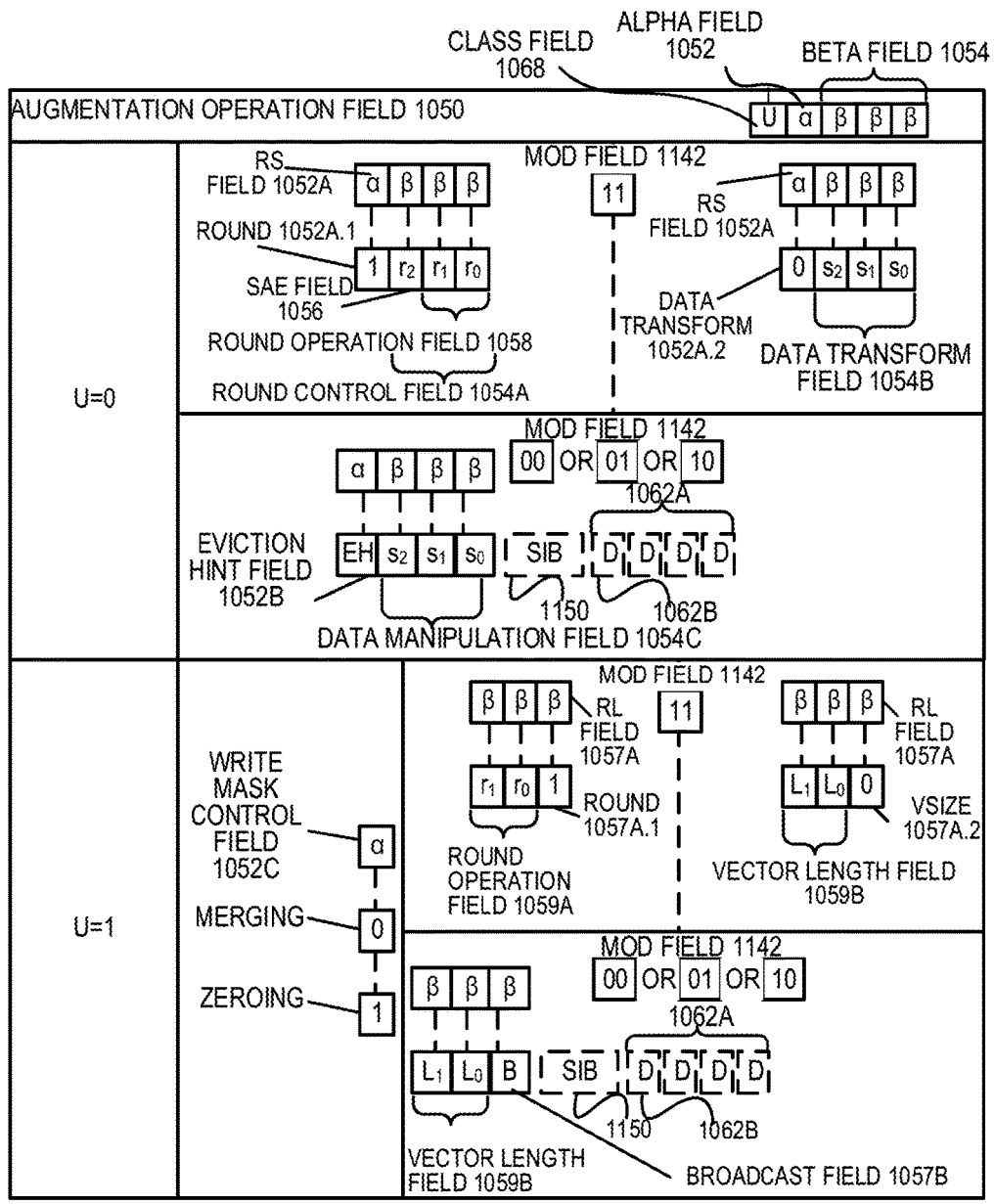

FIG. 11D is a block diagram illustrating the fields of the specific vector friendly instruction format 1100 that make up the augmentation operation field 1050 according to one embodiment of the invention. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.A2) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]-$L_{1-0}$) and the broadcast field 1057B (EVEX byte 3, bit [4]—B).

Exemplary Register Architecture

Figure 12:
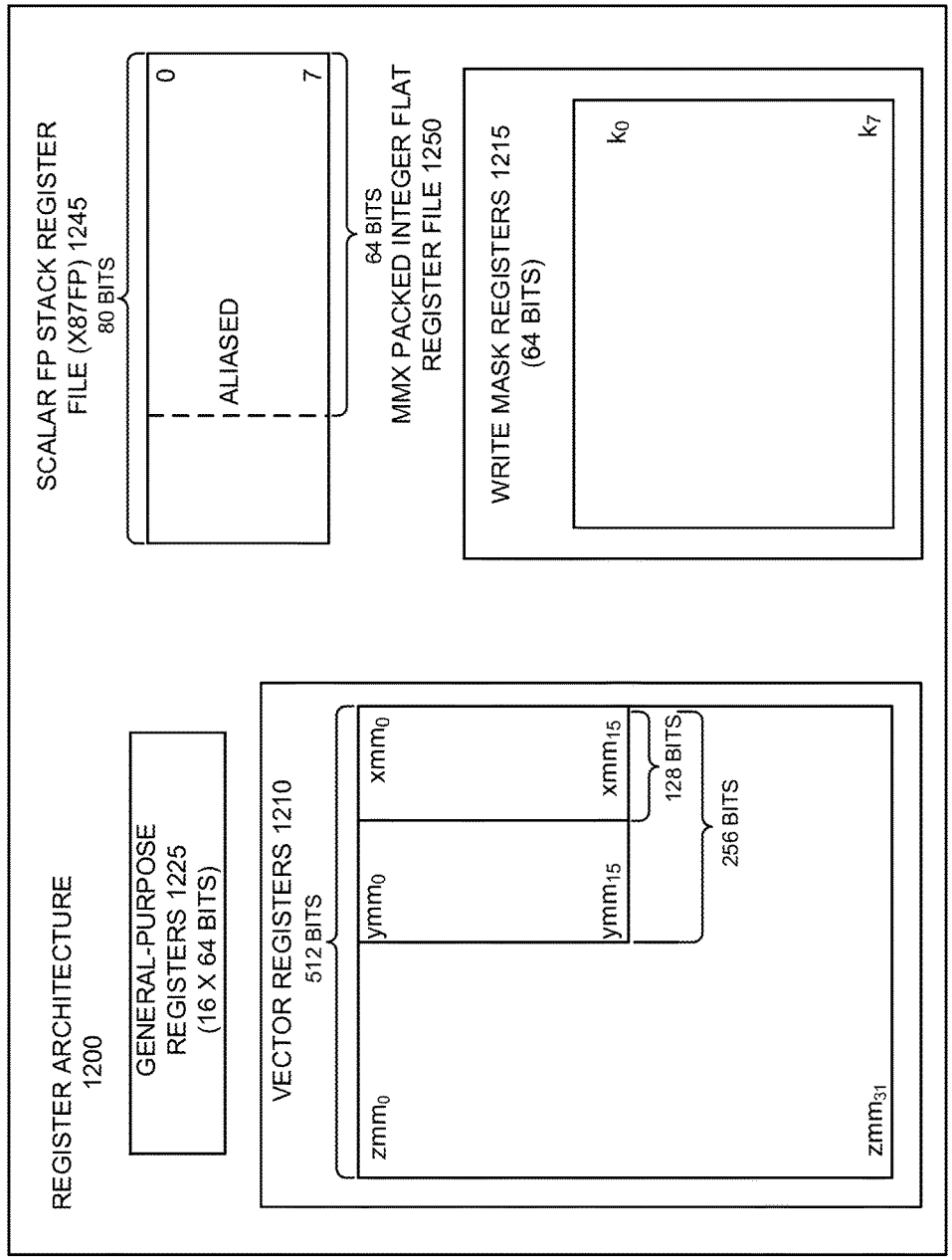
FIG. 12 is a block diagram of an embodiment of a register architecture.

FIG. 12 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
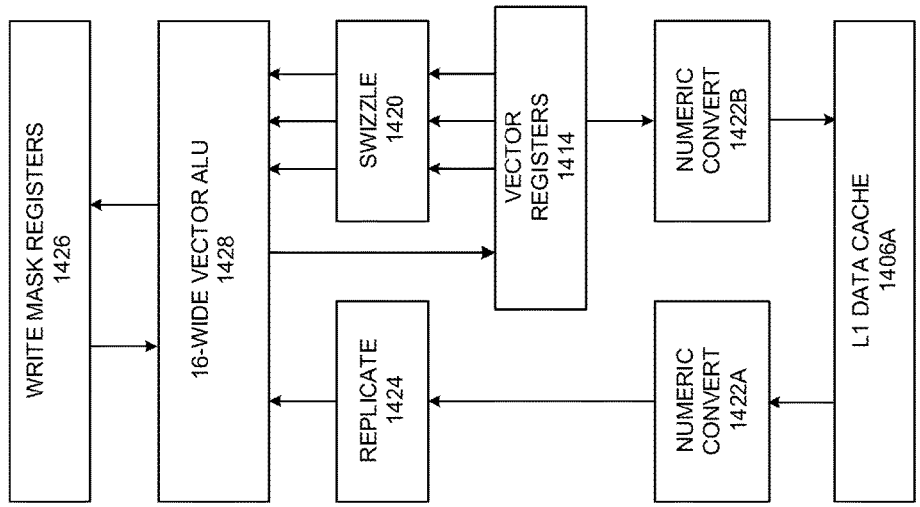
FIG. 14B is a block diagram of an embodiment of an expanded view of part of the processor core of FIG. 14A.
Figure 14A:
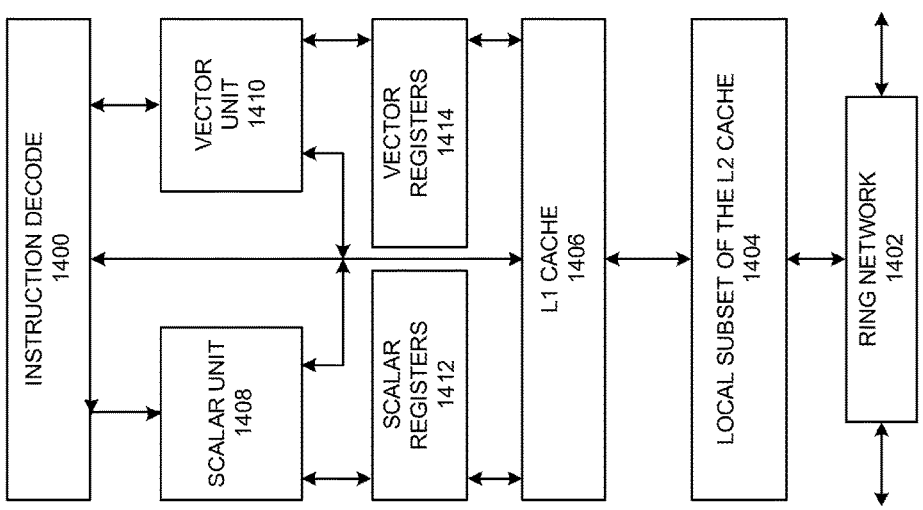
FIG. 14A is a block diagram of an embodiment of a single processor core, along with its connection to the on-die interconnect network, and with its local subset of the Level 2 (L2) cache.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Processor with Integrated Memory Controller and Graphics

Figure 15:
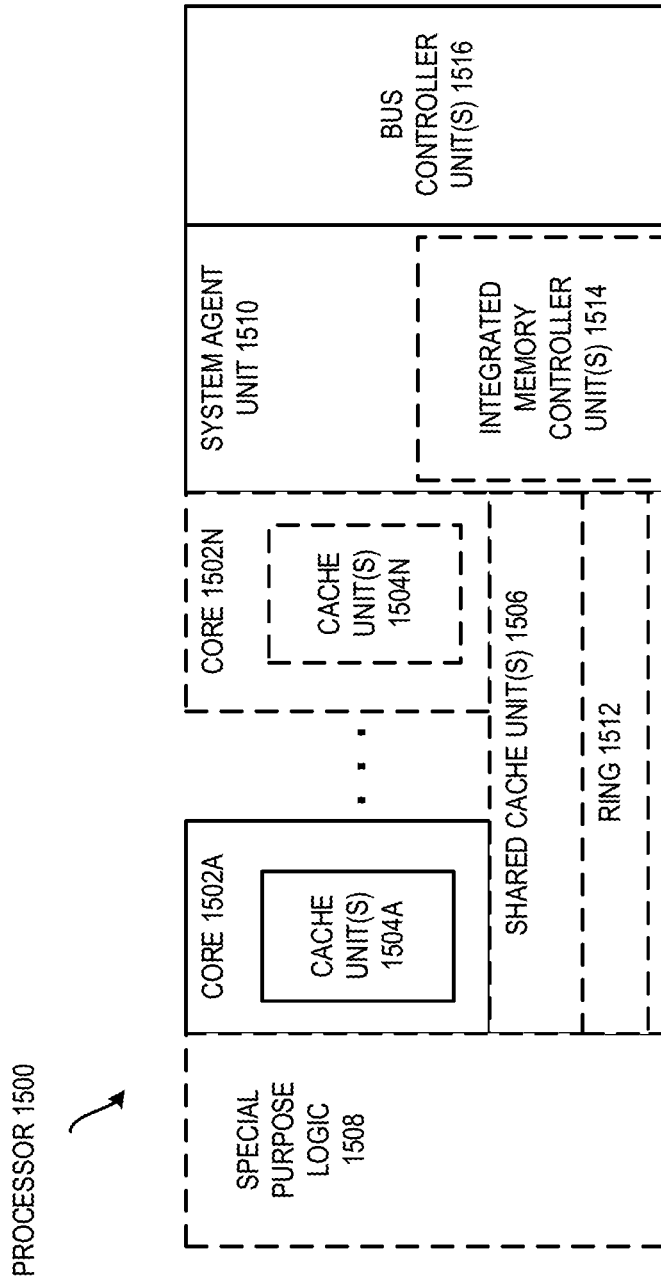
FIG. 15 is a block diagram of an embodiment of a processor that may have more than one core, may have an integrated memory controller, and may have integrated graphics.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multithreading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
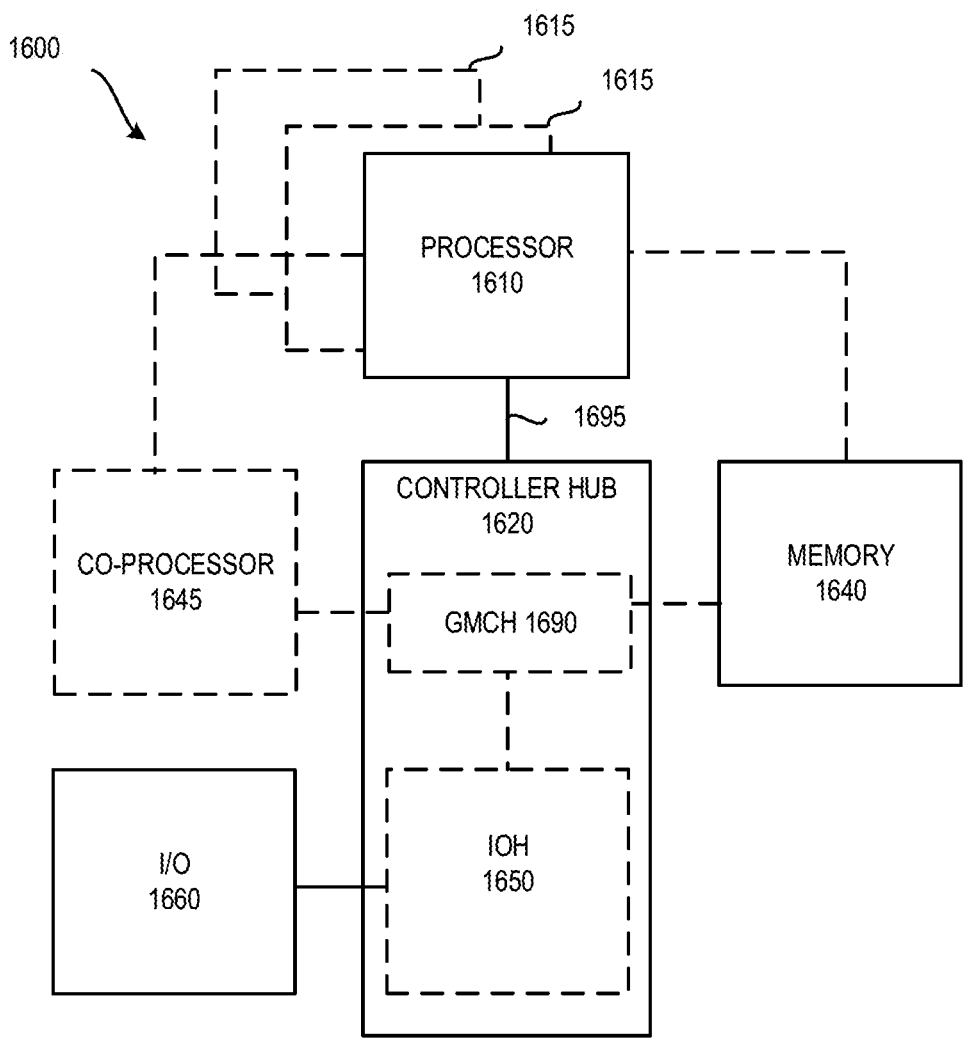
FIG. 16 is a block diagram of a first embodiment of a computer architecture.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
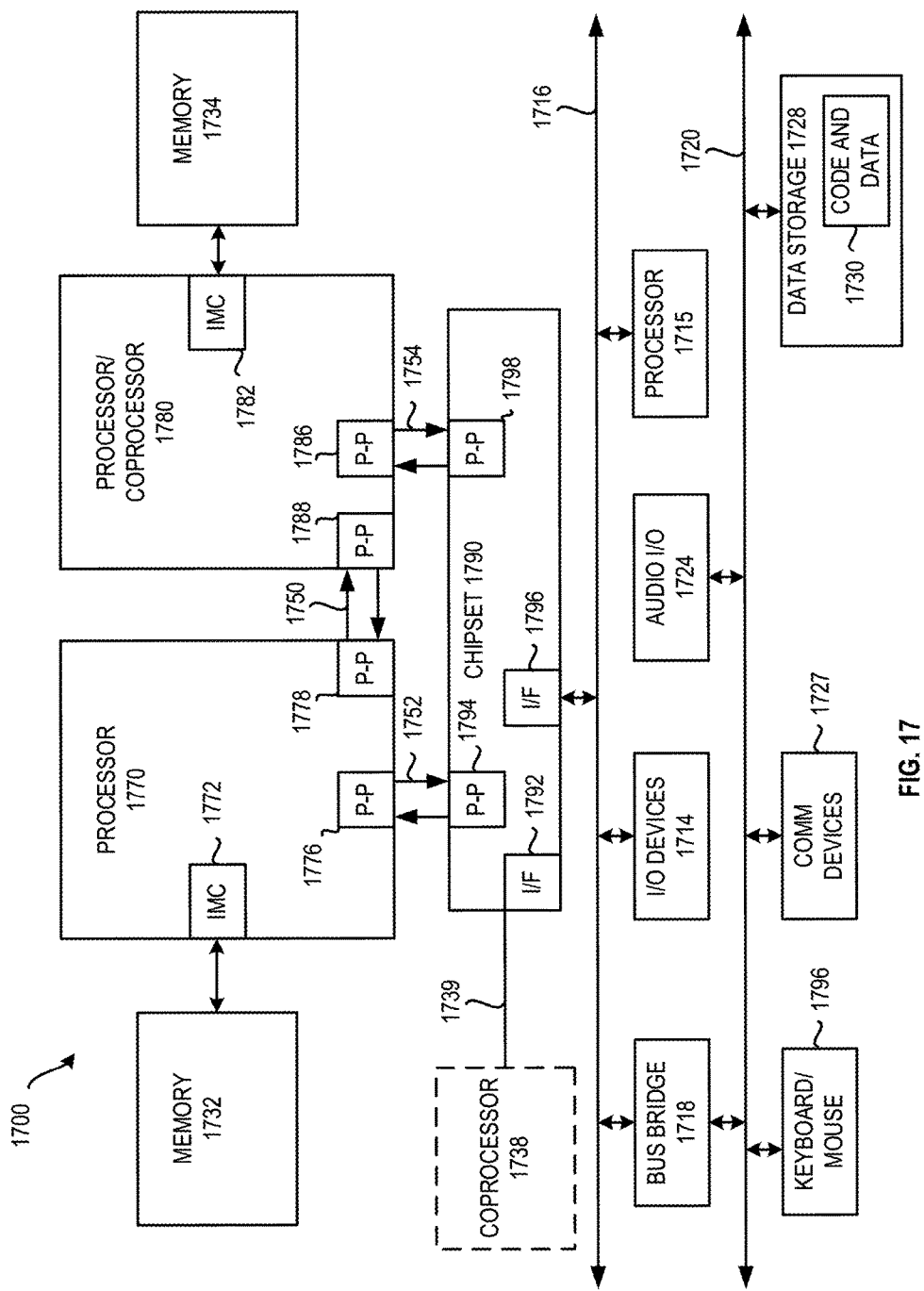
FIG. 17 is a block diagram of a second embodiment of a computer architecture.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
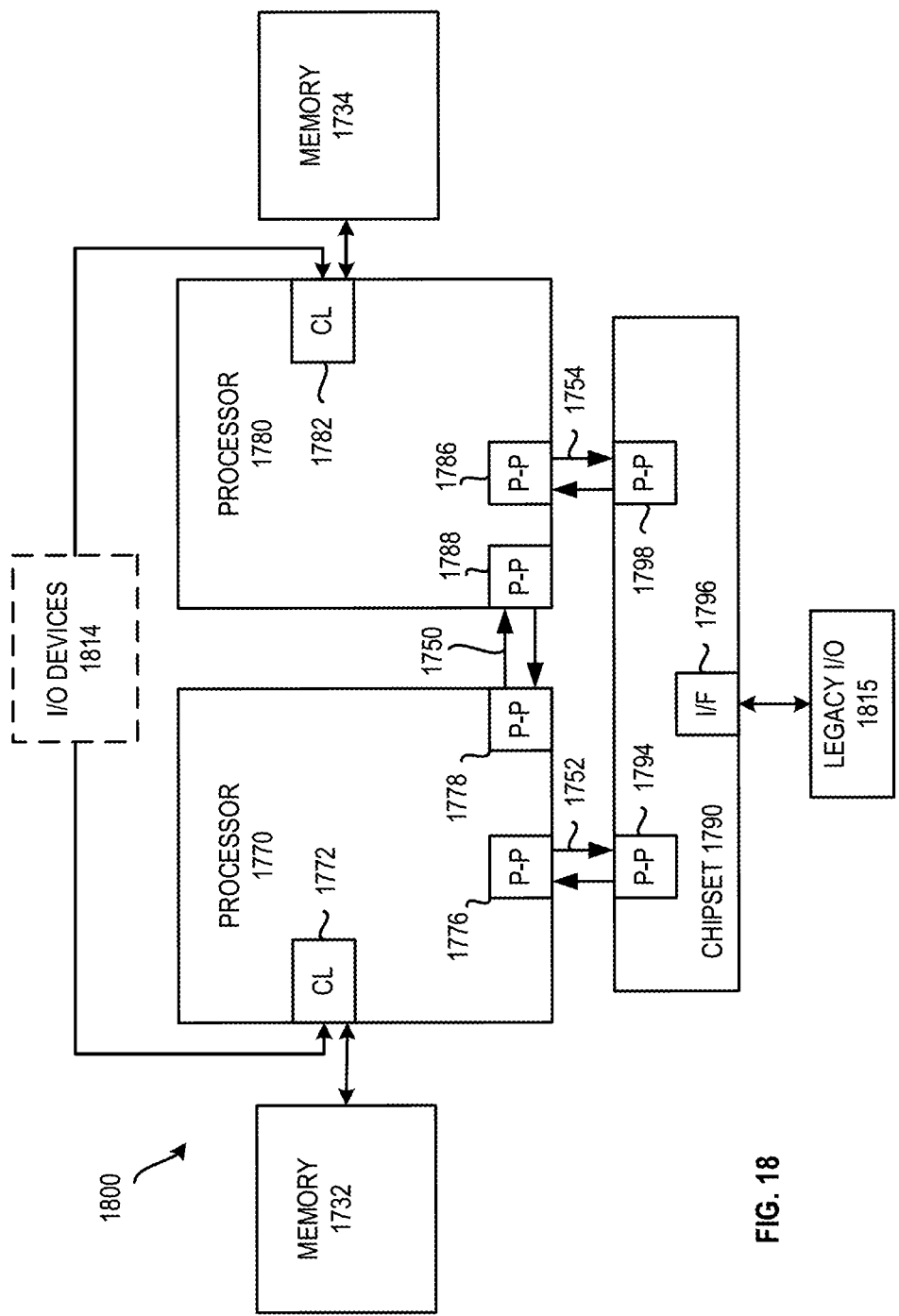
FIG. 18 is a block diagram of a third embodiment of a computer architecture.

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
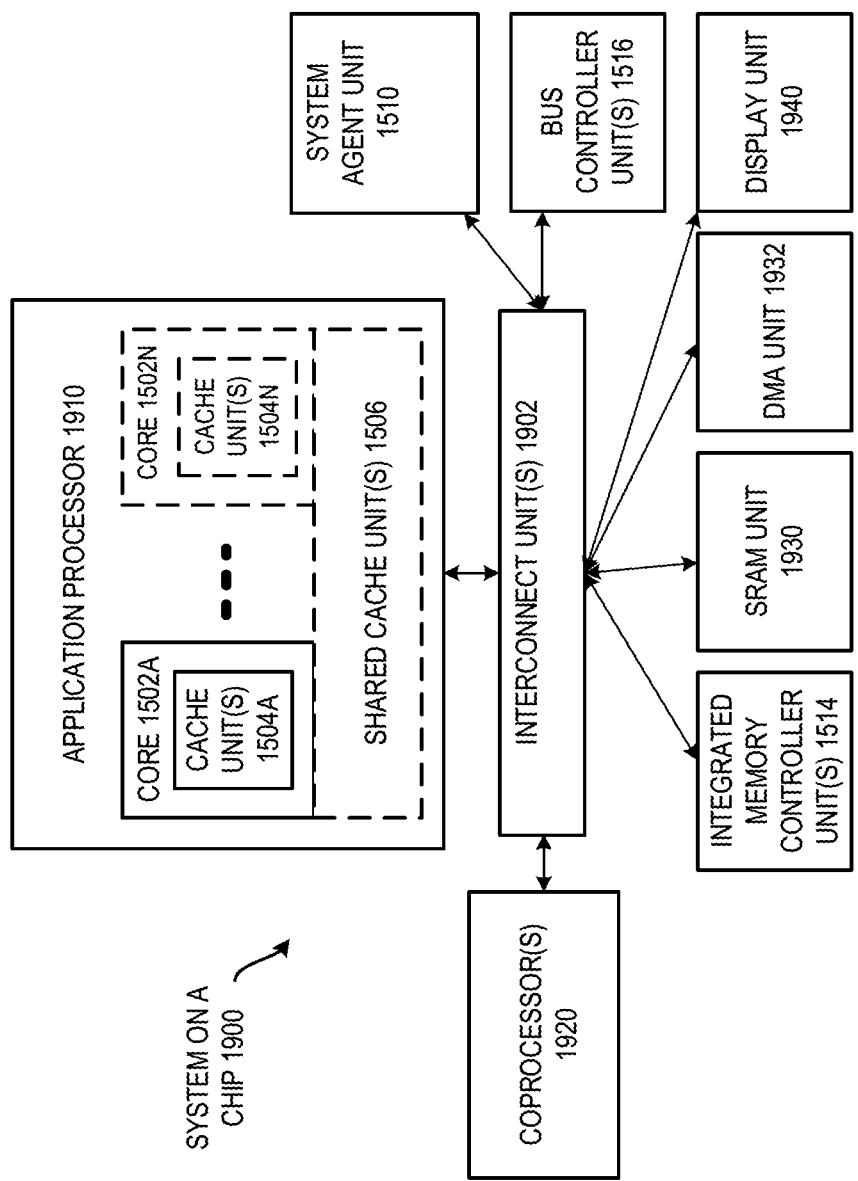
FIG. 19 is a block diagram of a fourth embodiment of a computer architecture.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
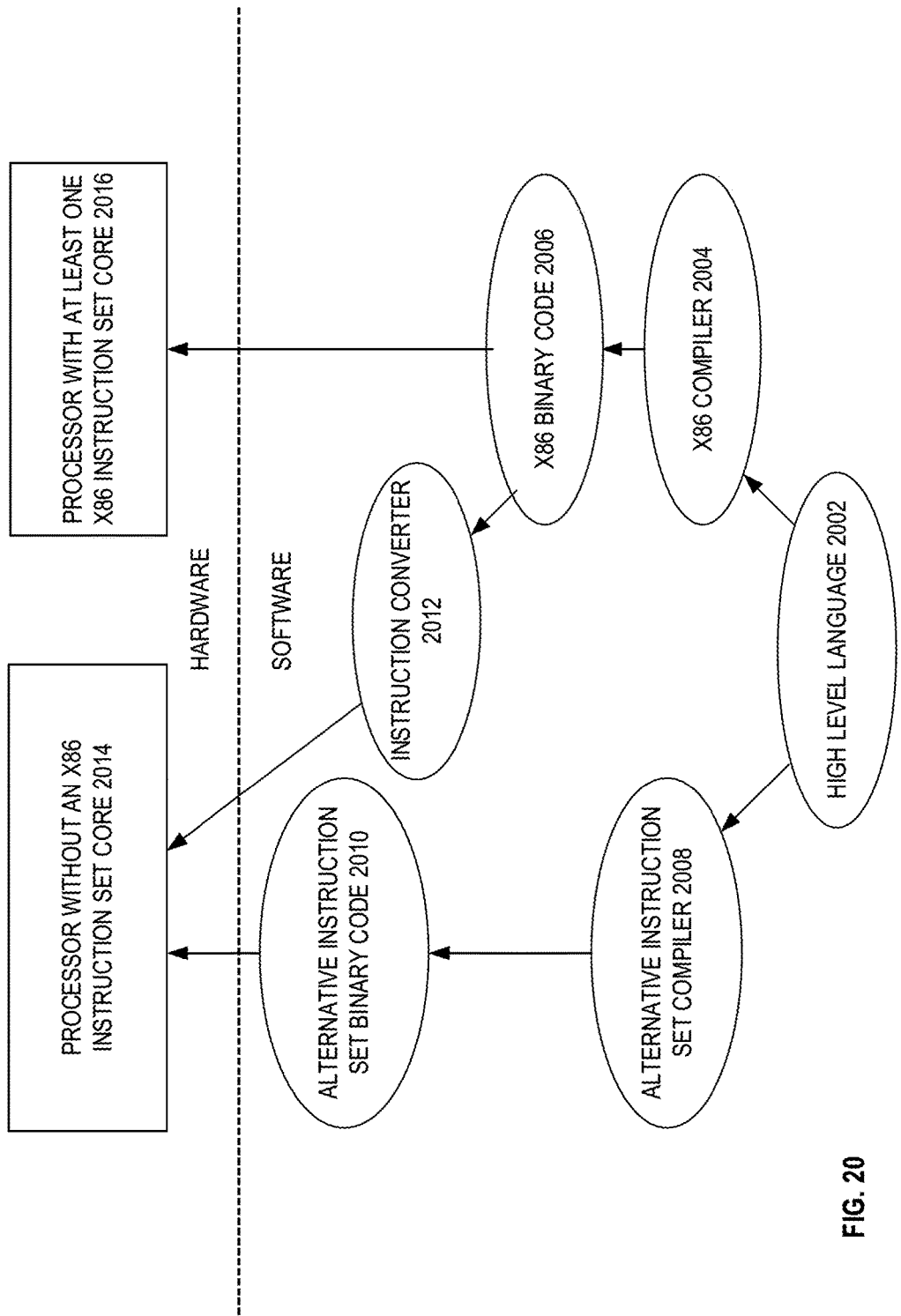
FIG. 20 is a block diagram of use of a software instruction converter to convert binary instructions in a source instruction set to binary instructions in a target instruction set, according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Components, features, and details described for any of FIGS. 3-8 may also optionally be used in FIG. 2. Components, features, and details described for any of FIGS. 4-5 may also optionally be used in FIG. 3. Components, features, and details described for any of FIGS. 7-8 may also optionally be used in FIG. 6. Moreover, components, features, and details described for the apparatus described herein may also optionally be used in and/or apply to the methods described herein, which in embodiments may be performed by and/or with such apparatus. Any of the processors described herein may be included in any of the computer systems or other systems disclosed herein. In some embodiments, the instructions may have any of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or otherwise clearly apparent.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a plurality of packed data registers, and a decode unit to decode a no-locality hint vector memory access instruction. The no-locality hint vector memory access instruction to indicate a packed data register of the plurality of packed data registers that is to have a source packed memory indices. The source packed memory indices to have a plurality of memory indices. The no-locality hint vector memory access instruction is to provide a no-locality hint to the processor for data elements that are to be accessed with the memory indices. The processor also includes an execution unit coupled with the decode unit and the plurality of packed data registers. The execution unit, in response to the no-locality hint vector memory access instruction, is to access the data elements at memory locations that are based on the memory indices.

Example 2 includes the processor of Example 1, further including a cache hierarchy, and in which the no-locality hint vector memory access instruction includes a no-locality hint vector load instruction. The execution unit, in response to the no-locality hint vector load instruction, is to load the data elements from the memory locations. The cache hierarchy, in response to the no-locality hint vector load instruction, is optionally not to cache the data elements loaded from the memory locations.

Example 3 includes the processor of any of Examples 1-2, further including a cache hierarchy, and in which the no-locality hint vector memory access instruction includes a no-locality hint vector load instruction. The execution unit, in response to the no-locality hint vector load instruction, is to load the data elements from the memory locations. The cache hierarchy, in response to the no-locality hint vector load instruction, upon a cache miss for a data element, is optionally not to allocate space in the cache hierarchy for the data element that is to be loaded from memory.

Example 4 includes the processor of any of Examples 1-3, further including a cache hierarchy, and in which the no-locality hint vector memory access instruction includes a no-locality hint vector load instruction. The execution unit, in response to the no-locality hint vector load instruction, is to load the data elements from the memory locations. The cache hierarchy, in response to the no-locality hint vector load instruction, upon a cache hit for a data element, is optionally to output no more than half a cache line from the cache hierarchy.

Example 5 includes the processor of Example 4, in which the cache hierarchy, in response to the no-locality hint vector load instruction, upon the cache hit for the data element, is optionally to output no more than a single data element from the cache hierarchy.

Example 6 includes the processor of any of Examples 1-4, further including a memory controller, and in which the no-locality hint vector memory access instruction includes a no-locality hint vector load instruction. The memory controller, in response to the no-locality hint vector load instruction, is optionally to load no more than half a cache line amount of data for each of the data elements loaded from memory.

Example 7 includes the processor of Example 6, in which the memory controller, in response to the no-locality hint vector load instruction, is optionally to load no more than 128-bits for each of the data elements loaded from memory.

Example 8 includes the processor of any of Examples 1-7, in which the no-locality hint vector memory access instruction includes a no-locality hint gather instruction. The no-locality hint gather instruction is to indicate a destination packed data register of the plurality of packed data registers. The execution unit, in response to the no-locality hint gather instruction is to store a packed data result in the destination packed data register. The packed data result is to include the data elements gathered from the memory locations.

Example 9 includes the processor of Example 1, further including a memory controller, and in which the no-locality hint vector memory access instruction includes a no-locality hint vector write instruction. The execution unit, in response to the no-locality hint vector write instruction, is to write data elements of a source packed data indicated by the instruction over the data elements at the memory locations. The memory controller, in response to the no-locality hint vector write instruction, is optionally to write no more than half a cache line amount of data for each of the data elements of the source packed data that is written to memory.

Example 10 includes the processor of any of Examples 1 and 9, further including a cache hierarchy, and in which the no-locality hint vector memory access instruction includes a no-locality hint vector write instruction. The execution unit, in response to the no-locality hint vector write instruction, is to write data elements of a source packed data indicated by the instruction over the data elements at the memory locations. The cache hierarchy, in response to the no-locality hint vector write instruction, upon a cache hit for a data element in a lower level cache, is optionally not to bring a cache line associated with the cache hit into a higher level cache.

Example 11 includes the processor of any of Examples 1, 9, and 10, in which the no-locality hint vector memory access instruction includes a no-locality hint scatter instruction, and in which the no-locality hint scatter instruction is to indicate a second packed data register of the plurality of packed data registers that is to have a source packed data that is to include a plurality of data elements. The execution unit, in response to the no-locality hint scatter instruction, is optionally to write the data elements of the source packed data over the data elements at the memory locations.

Example 12 includes the processor of any of Examples 1-11, in which the decode unit is to decode the no-locality hint vector memory access instruction that is optionally to have at least one bit that is to have a first value to indicate the no-locality hint and is to have a second value to indicate lack of the no-locality hint.

Example 13 includes the processor of any of Examples 1-11, in which the decode unit is to decode the no-locality hint vector memory access instruction that is optionally to have a plurality of bits that are to have a first value to indicate that the no-locality hint is a no-temporal locality hint, a second value to indicate that the no-locality hint is a no-spatial locality hint, and a third value to indicate that the no-locality hint is a no-temporal and no-spatial locality hint.

Example 14 includes the processor of any of Examples 1-13, in which the decode unit is to decode the no-locality hint vector memory access instruction that is optionally to indicate a source packed data operation mask.

Example 15 includes a method in a processor including receiving a no-locality hint vector memory access instruction. The no-locality hint vector memory access instruction indicating a source packed memory indices having a plurality of memory indices. The no-locality hint vector memory access instruction provides a no-locality hint to the processor for data elements that are to be accessed with the memory indices. The method also includes accessing the data elements at memory locations that are based on the memory indices in response to the no-locality hint vector memory access instruction.

Example 16 includes the method of Example 15, in which receiving the no-locality hint vector memory access instruction includes receiving a no-locality hint vector load instruction, and the accessing includes loading the data elements from the memory locations. The method further includes optionally omitting caching data elements that are loaded from memory in a cache hierarchy.

Example 17 includes the method of any of Examples 15-16, in which receiving the no-locality hint vector memory access instruction includes receiving a no-locality hint vector load instruction, and in which accessing includes loading the data elements from the memory locations. The method further includes, upon a cache hit for a data element in a cache hierarchy, optionally outputting no more than half a cache line from the cache hierarchy.

Example 18 includes the method of any of Examples 15-17, in which receiving the no-locality hint vector memory access instruction includes receiving a no-locality hint vector load instruction. The accessing includes loading the data elements from the memory locations including optionally loading no more than half a cache line amount of data for each data element loaded from memory.

Example 19 includes the method of Example 15, in which receiving the no-locality hint vector memory access instruction includes receiving a no-locality hint vector write instruction. The accessing includes writing data elements of a source packed data indicated by the instruction over data elements at the memory locations including optionally writing no more than half a cache line amount of data for each data element that is written to memory.

Example 20 includes the method of any of Examples 15 and 19, in which receiving the no-locality hint vector memory access instruction includes receiving a no-locality hint vector write instruction. The accessing includes writing data elements of a source packed data indicated by the instruction over data elements at the memory locations. The method further includes, upon a cache hit for a data element in a lower level cache, optionally not bringing a cache line associated with the cache hit into a higher level cache.

Example 21 includes a system to process instructions including an interconnect, and a processor coupled with the interconnect. The processor is to receive a no-locality hint vector memory access instruction. The no-locality hint vector memory access instruction is to indicate a source packed memory indices. The source packed memory indices is to have a plurality of memory indices. The no-locality hint vector memory access instruction is to provide a no-locality hint to the processor for data elements that are to be accessed with the memory indices. The processor, in response to the no-locality hint vector memory access instruction, is to access the data elements at memory locations that are based on the memory indices. The system also includes a dynamic random access memory (DRAM) coupled with the interconnect.

Example 22 includes the system of Example 21, in which the no-locality hint vector memory access instruction includes a no-locality hint gather instruction. The processor, in response to the no-locality hint gather instruction, is optionally not to cache data elements loaded from memory in response to the no-locality hint gather instruction in a cache hierarchy.

Example 23 includes an article of manufacture including a non-transitory machine-readable storage medium. The non-transitory machine-readable storage medium stores a no-locality hint vector load instruction. The no-locality hint vector load instruction is to indicate a packed data register that is to have a source packed memory indices that is to have a plurality of memory indices. The instruction is also to indicate a destination packed data register. The no-locality hint vector memory access instruction is to provide a no-locality hint. The no-locality hint vector load instruction, if executed by a machine, is to cause the machine to perform operations including storing a packed data result in the destination packed data register. The packed data result to include data elements gathered from memory locations that are based on the memory indices. The operations also include omitting caching data elements that have been loaded from memory in a cache hierarchy.

Example 24 includes the article of manufacture of Example 23, in which the instruction is optionally to cause the machine to load less than a half cache line amount of data for each data element loaded from memory.

Example 25 includes a processor or other apparatus that is operative to perform the method of any one of Examples 15-20.

Example 26 includes a processor or other apparatus that includes means for performing the method of any one of Examples 15-20.

Example 27 includes a processor that includes any combination of modules, units, logic, circuitry, and means to perform the method of any one of Examples 15-20.

Example 28 includes an article of manufacture that includes an optionally non-transitory machine-readable medium that optionally stores or otherwise provides an instruction that if and/or when executed by a processor, computer system, or other machine is operative to cause the machine to perform the method of any one of Examples 15-20.

Example 29 includes a computer system or other electronic device including an interconnect, the processor of any one of Examples 1-14 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 30 includes a processor or other apparatus substantially as described herein.

Example 31 includes a processor or other apparatus that is operative to perform any method substantially as described herein.

Example 32 includes a processor or other apparatus including means for performing any method substantially as described herein.

Example 33 includes a processor or other apparatus that is operative to perform any no-locality hint vector memory access instruction substantially as described herein.

Example 34 includes a processor or other apparatus including means for performing any no-locality hint vector memory access instruction substantially as described herein.

What is claimed is:

1. A processor comprising:
   a plurality of packed data registers;
   a decode unit to decode a no-locality hint vector memory access instruction, the no-locality hint vector memory access instruction to indicate a packed data register of the plurality of packed data registers that is to have a source packed memory indices, the source packed memory indices to have a plurality of memory indices, wherein an opcode of the no-locality hint vector memory access instruction is to provide a no-locality hint to the processor for data elements that are to be accessed with the memory indices;
   an execution unit coupled with the decode unit and the plurality of packed data registers, the execution unit, in response to the no-locality hint vector memory access instruction, to access the data elements at memory locations that are based on the memory indices; and
   a cache hierarchy, wherein the no-locality hint vector memory access instruction comprises a no-locality hint vector load instruction, wherein the execution unit, in response to the no-locality hint vector load instruction, is to load the data elements from the memory locations, and wherein the cache hierarchy, in response to the no-locality hint vector load instruction, upon a cache hit for a data element, is to output no more than half a cache line from the cache hierarchy.

2. The processor of claim 1, wherein the cache hierarchy, in response to the no-locality hint vector load instruction, is not to cache the data elements loaded from the memory locations.

3. The processor of claim 1, wherein the cache hierarchy, in response to the no-locality hint vector load instruction, upon the cache hit for the data element, is to output no more than a single data element from the cache hierarchy.

4. The processor of claim 1, wherein the no-locality hint vector memory access instruction comprises a no-locality hint gather instruction, wherein the no-locality hint gather instruction is to indicate a destination packed data register of the plurality of packed data registers, wherein the execution unit, in response to the no-locality hint gather instruction, is to store a packed data result in the destination packed data register, and wherein the packed data result is to include the data elements gathered from the memory locations.

5. The processor of claim 1, wherein the decode unit is to decode the no-locality hint vector memory access instruction that is to have at least one bit that is to have a first value to indicate the no-locality hint, and is to have a second value to indicate lack of the no-locality hint.

6. The processor of claim 1, wherein the decode unit is to decode the no-locality hint vector memory access instruction that is to have a plurality of bits that are to have a first value to indicate that the no-locality hint is a no-temporal locality hint, a second value to indicate that the no-locality hint is a no-spatial locality hint, and a third value to indicate that the no-locality hint is a no-temporal and no-spatial locality hint.

7. The processor of claim 1, wherein the decode unit is to decode the no-locality hint vector memory access instruction that is to indicate a source packed data operation mask.

8. A processor comprising:
   a plurality of packed data registers;
   a decode unit to decode a no-locality hint vector memory access instruction, the no-locality hint vector memory access instruction to indicate a packed data register of the plurality of packed data registers that is to have a source packed memory indices, the source packed memory indices to have a plurality of memory indices, wherein an opcode of the no-locality hint vector memory access instruction is to provide a no-locality hint to the processor for data elements that are to be accessed with the memory indices;

an execution unit coupled with the decode unit and the plurality of packed data registers, the execution unit, in response to the no-locality hint vector memory access instruction, to access the data elements at memory locations that are based on the memory indices; and a memory controller, wherein the no-locality hint vector memory access instruction comprises a no-locality hint vector load instruction, and wherein the memory controller, in response to the no-locality hint vector load instruction, is to load no more than half a cache line amount of data, for each of the data elements loaded from memory.

9. The processor of claim 8, further comprising a cache hierarchy, wherein the cache hierarchy, in response to the no-locality hint vector load instruction, upon a cache miss for a data element, is not to allocate space in the cache hierarchy for the data element that is to be loaded from memory.

10. The processor of claim 8, wherein the memory controller, in response to the no-locality hint vector load instruction, is to load no more than 128-bits for each of the data elements loaded from memory.

11. A processor comprising:
a plurality of packed data registers;
a decode unit to decode a no-locality hint vector memory access instruction, the no-locality hint vector memory access instruction to indicate a packed data register of the plurality of packed data registers that is to have a source packed memory indices, the source packed memory indices to have a plurality of memory indices, wherein an opcode of the no-locality hint vector memory access instruction is to provide a no-locality hint to the processor for data elements that are to be accessed with the memory indices;
an execution unit coupled with the decode unit and the plurality of packed data registers, the execution unit, in response to the no-locality hint vector memory access instruction, to access the data elements at memory locations that are based on the memory indices; and
a memory controller, wherein the no-locality hint vector memory access instruction comprises a no-locality hint vector write instruction, wherein the execution unit, in response to the no-locality hint vector write instruction, is to write data elements of a source packed data indicated by the instruction over the data elements at the memory locations, and wherein the memory controller, in response to the no-locality hint vector write instruction, is to write no more than half a cache line amount of data, for each of the data elements of the source packed data that is written to memory.

12. The processor of claim 11, further comprising a cache hierarchy, and wherein the cache hierarchy, in response to the no-locality hint vector write instruction, upon a cache hit for a data element in a lower level cache, is not to bring a cache line associated with the cache hit into a higher level cache.

13. The processor of claim 11, wherein the no-locality hint vector memory access instruction comprises a no-locality hint scatter instruction, wherein the no-locality hint scatter instruction is to indicate a second packed data register of the plurality of packed data registers that is to have the source packed data that is to include the data elements, wherein the execution unit, in response to the no-locality hint scatter instruction, is to write the data elements of the source packed data over the data elements at the memory locations.

14. A method in a processor comprising:
receiving a no-locality hint vector memory access instruction, the no-locality hint vector memory access instruction indicating a source packed memory indices having a plurality of memory indices, wherein an opcode of the no-locality hint vector memory access instruction provides a no-locality hint to the processor for data elements that are to be accessed with the memory indices; and
accessing the data elements at memory locations that are based on the memory indices in response to the no-locality hint vector memory access instruction, wherein receiving the no-locality hint vector memory access instruction comprises receiving a no-locality hint vector load instruction, wherein accessing comprises loading the data elements from the memory locations; and
upon a cache hit for a data element in a cache hierarchy, outputting no more than half a cache line from the cache hierarchy.

15. The method of claim 14, further comprising omitting caching data elements that are loaded from memory in a cache hierarchy.

16. A processor comprising:
a plurality of packed data registers;
a decode unit to decode a no-locality hint vector memory access instruction, the no-locality hint vector memory access instruction to indicate a packed data register of the plurality of packed data registers that is to have a source packed memory indices, the source packed memory indices to have a plurality of memory indices, wherein the no-locality hint vector memory access instruction is to provide a no-spatial locality but temporal locality hint to the processor for data elements that are to be accessed with the memory indices;
an execution unit coupled with the decode unit and the plurality of packed data registers, the execution unit, in response to the no-locality hint vector memory access instruction, to access the data elements at memory locations that are based on the memory indices; and
a memory controller, wherein the no-locality hint vector memory access instruction comprises a no-locality hint vector load instruction, and wherein the memory controller, in response to the no-locality hint vector load instruction, is to load no more than half a cache line amount of data, for each of the data elements loaded from memory.

17. The processor of claim 16, wherein the no-locality hint vector memory access instruction comprises a no-locality hint gather instruction, wherein the no-locality hint gather instruction is to indicate a destination packed data register of the plurality of packed data registers, wherein the execution unit, in response to the no-locality hint gather instruction, is to store a packed data result in the destination packed data register, and wherein the packed data result is to include the data elements gathered from the memory locations.

* * * * *